(12) United States Patent
Hsieh et al.

(10) Patent No.: US 6,757,019 B1
(45) Date of Patent: Jun. 29, 2004

(54) LOW-POWER PARALLEL PROCESSOR AND IMAGER HAVING PERIPHERAL CONTROL CIRCUITRY

(75) Inventors: Jeff Y. F. Hsieh, Mountain View, CA (US); Teresa H. Y. Meng, Portola Valley, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/523,584

(22) Filed: Mar. 10, 2000

Related U.S. Application Data

(60) Provisional application No. 60/124,329, filed on Mar. 13, 1999.

(51) Int. Cl.[7] ........................... H04N 3/14; H04N 5/335
(52) U.S. Cl. ..................... 348/302; 348/294; 348/308
(58) Field of Search .............................. 348/308, 302, 348/306, 294; 250/208.1

(56) References Cited

U.S. PATENT DOCUMENTS

| | | | | |
|---|---|---|---|---|
| 5,184,018 A | * | 2/1993 | Conrads et al. | 250/370.09 |
| 5,436,442 A | * | 7/1995 | Michon et al. | 250/208.1 |
| 5,665,959 A | * | 9/1997 | Fossum et al. | 250/208.1 |
| 5,949,483 A | * | 9/1999 | Fossum et al. | 348/303 |
| 6,057,539 A | * | 5/2000 | Zhou et al. | 250/208.1 |
| 6,133,862 A | * | 10/2000 | Dhuse et al. | 341/118 |
| 6,166,367 A | * | 12/2000 | Cho | 250/208.1 |
| 6,201,573 B1 | * | 3/2001 | Mizuno | 348/308 |
| 6,344,877 B1 | * | 2/2002 | Gowda et al. | 348/245 |
| 6,573,936 B2 | * | 6/2003 | Morris et al. | 348/294 |

FOREIGN PATENT DOCUMENTS

WO          WO 99/63751         * 12/1999

* cited by examiner

*Primary Examiner*—Aung Moe

(57) ABSTRACT

The present invention implements a parallel processing architecture in which a plurality of parallel processors concurrently operate upon a different block, preferably a column, of image data. Implemented on a single monolithic integrated circuit chip, this single chip solution has characteristics that provide the throughput necessary to perform computationally complex operations, such as color correction, RGB to YUV conversion and DCT operations in either still or video applications, and motion estimation in digital video processing applications. Particular uses of the invention in systems processing image data according to an MPEG2 image compression technique and according to a digital video (DV) image compression technique are disclosed.

15 Claims, 9 Drawing Sheets

ADDRESS(x,y) = BASE ADDRESS(x,y) + OFFSET ADDRESS(x,y)

|                      | TOTAL     |
|----------------------|-----------|
| DCT                  | 41,500    |
| IDCT                 | 52,000    |
| FIELD TO FRAME       | 42,300    |
| FRAME TO FIELD       | 14,500    |
| QUANTIZATION         | 6,000     |
| INVERSE QUANTIZATION | 9,700     |
| MOTION ESTIMATION    | 582,000   |
| RGB TO YUV           | 57,700    |
| MOTION COMPENSATION  | 4,000     |
| I FRAME              | 223,000   |
| P FRAME              | 821,000   |
| B FRAME              | 1,405,000 |

LOW-POWER PARALLEL PROCESSOR AND IMAGER HAVING PERIPHERAL CONTROL CIRCUITRY

This application claims the benefit of provisional application No. 60/124,329, filed Mar. 13, 1999.

FIELD OF THE INVENTION

This invention relates to a low-power, single chip, parallel processor and imager system, and, more specifically, in a first embodiment, a low power, large scale MPEG2 encoder and imager system for a single-chip digital CMOS video camera is disclosed. The invention also relates to such systems having additional peripheral control processing circuitry for managing processing of the parallel processing elements and for formatting data therefrom. In connection with this aspect, a second embodiment of a lower power digital video (DV) architecture suitable for use in digital camcorders and the like is disclosed.

BACKGROUND

Processing of digital data obtained from an image sensor requires complex calculations. Processing of video data, which requires motion estimation, is particularly computationally intensive. Accordingly, various techniques have been proposed to meet these processing requirements. Thus, processors capable of performing over one billion operations per second are becoming commonplace.

A conflicting requirement for certain applications, however, is that the overall power be minimized, especially for devices such as camcorders and the like that are required to be battery powered. Thus, although the same complex calculations are required, they must be performed with a system that uses minimal amounts of power, so that the devices can operate for a reasonable period of time before requiring recharging.

Existing video processing engines are designed to optimize processing of video data stored in a secondary storage medium, e.g., random access memory, hard drive, or DVD. This results in a need for an external chipset whose primary task is to provide the necessary bandwidth for data transfer between the video engine and the secondary storage medium. The requirement of such an external data transfer eliminates the possibility for a low-power, single-chip solution.

Another existing solution that uses less power is a single integrated circuit chip for both the image sensor and digital processor. An example of such a single integrated circuit chip is the VLSI Vision Limited VV6405 NTSC Colour CMOS Image Sensor. The digital processor disclosed operates upon consecutive rows of pixel data sequentially to perform simple pixel-level computations. While this solution uses less power than other alternatives, it does not have the ability to perform operations at rates that are desired.

SUMMARY OF THE INVENTION

It is an object of the present invention, therefore, to provide an integrated image sensor and processor architecture which satisfies low power requirements.

It is a further object of the present invention to provide an integrated image sensor and processor capable of performing complex operations.

It is yet another object of the present invention to provide an integrated image sensor and processor which can output formatted image data.

It is yet another object of the present invention to provide an integrated image sensor and processor which can easily distribute processing tasks among parallel processing elements and control elements as dictated by image processing algorithms.

In view of the above recited objects, among others, the present invention implements a parallel processing architecture in which a plurality of parallel processors concurrently operate upon a different block, preferably a column, of image data. Implemented on a single monolithic integrated circuit chip, this single chip solution has characteristics that provide the throughput necessary to perform computationally complex operations, such as color correction, RGB to YUV conversion and DCT operations in either still or video applications, and motion estimation in digital video processing applications.

In a specific first embodiment according to the present invention, a parallel processor and imager system according to the present invention implements in a preferred first embodiment a single-chip digital CMOS video camera with real-time MPEG2 encoding capability. Computationally intensive operations of the video compression algorithms can be performed on-chip, at a location right beside the output of the imager, resulting in low latency and low power consumption. In all embodiments, this architecture takes advantage of parallelism in image processing algorithms, which is exploited to obtain efficient processing.

In another embodiment of the invention, a low-power, large-scale parallel digital video encoder suitable for use in a single-chip digital CMOS video camera or the like provides, in addition to basic functionality similar to that above, formatting and streaming of compressed output image data. By internalizing data transfers and compressing the exported data, the system exhibits lower power consumption than comparable multi-chip implementations which transfer large amounts of raw, uncompressed data between chips. Further, by adding peripheral processing capabilities, the processing load per image column is reduced, thereby leading to a lower clock rate and supply voltage which results in a further reduction in power consumption.

BRIEF DESCRIPTION OF THE DRAWINGS

These and other objects, features, and advantages of the present invention are better understood by reading the following detailed description of the preferred embodiments, taken in conjunction with the accompanying drawings, in which:

FIG. 8 provides a table of estimated cycle count per processor per frame needed for each encoding/decoding step;

DETAILED DESCRIPTION

First Preferred Embodiment

The present invention, in its most basic form, has the capacity to sense to a single image, generate pixel data as a result of the sensed image, and concurrently process that image using a plurality of parallel processors, each of which simultaneously operate on portions of the pixel data associated with the image. In a first preferred embodiment, as described hereinafter, the portions of the pixel image that each processor operates upon is a column of pixel data, although pixel data that is concurrently operated upon can be divided in various other ways, such as blocks.

Figure 1:
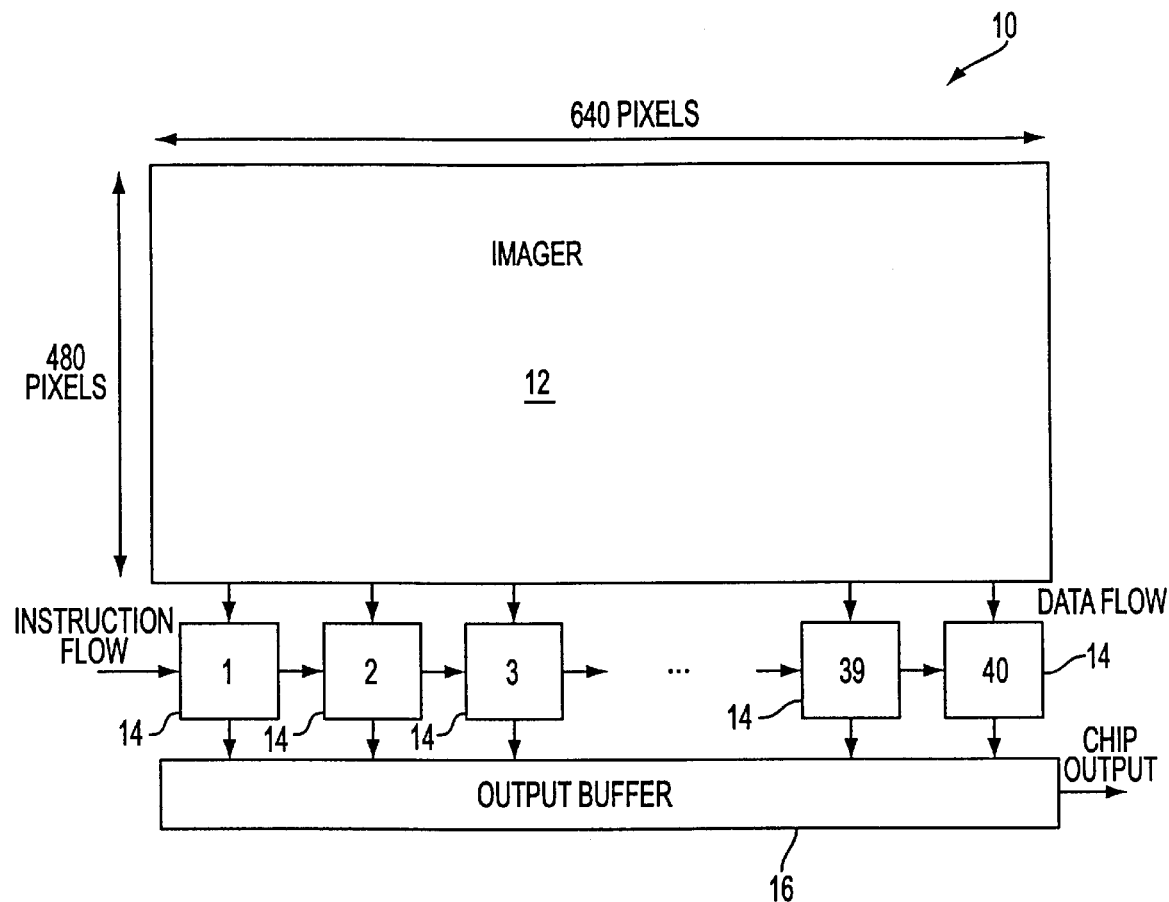
FIG. 1 illustrates a single monolithic integrated circuit containing an image sensor array and parallel processors according to a first preferred embodiment of the present invention.

As illustrated in FIG. 1, digital processor and imager system 10 includes a sensor array 12 that detects an image and generates detected signals corresponding thereto. This sensor array 12 is preferably a CMOS photo sensor array, but could also be other types of arrays, such as charge coupled devices. Also included in the system 10 are a plurality of parallel processors 14, each of which inputs certain predetermined ones of the detected signals by being coupled to and in close proximity with the sensor array 12, and also being coupled to an output buffer 16. The image data, such as from a single image that is sensed in a digital camera, is detected by the sensor array 12, and the detected signals, also called pixel data, are transmitted columnwise into a plurality of parallel processors 14, forty in the first embodiment illustrated. Each of the forty processors operates upon the input detected signals to generate encoded signals, which are then output to the output buffer 16, the encoded signals being encoded based upon the algorithm that each of the processors is implementing. In the specific fist preferred embodiment disclosed hereinafter, the number of parallel processors, the size of each of the parallel processors, the search space within a processor domain, and the size of certain memories, for instance, are based upon an array having a predetermined resolution of 640×480 array of sensing elements.

It should be noted, however, that, for each of the embodiments described, the specific numbers of processors, implementation of each processor, and search space, memory requirements, and other specific implementation aspects as recited are not intended to be limiting, but instead to completely describe a first presently preferred embodiment. As described, the relationship of specific implementation aspects is not arbitrary, but based upon considerations in which computationally intensive operations can be simultaneously repeated by multiple processors in order to obtain the fullest throughput. This throughput is dependent in part upon the algorithms that need to be implemented, for example the fact that motion estimation requires knowledge of neighboring pixel data, whereas RGB to YUV conversion and DCT operations do not require such knowledge. Further, the size of the sensing array will assist in determining the proper search space, with the larger the sensor array, the larger the search space being able to be without having adverse effects on throughput and increased power usage. Similarly, the larger the number of pixels that each processor operates upon, the greater the resulting clock rate, and the more complex the associated circuitry becomes. Accordingly, specific implementation aspects are dependent upon factors such as these.

Figure 2A:
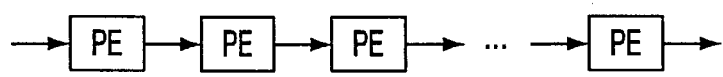
FIGS. 2A–C illustrate alternative manners in which instructions can be fed into each of the plurality of parallel processors according to the first embodiment.
Figure 2B:
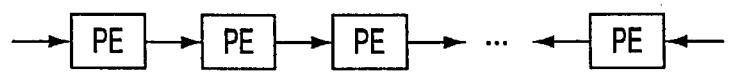
Figure 2C:
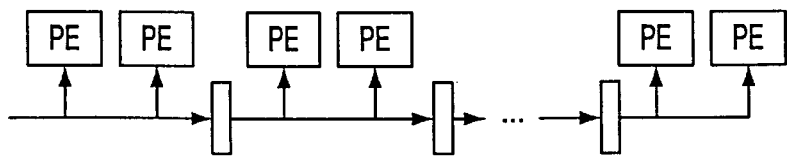

FIGS. 2A–2C illustrate the manner in which the parallel processors 14 can be loaded with instructions that will then cause them to perform the intended operation. As illustrated in FIG. 2A, each processor 14 can sequentially receive the same instruction, whereas FIGS. 2B and 2C illustrate more complex instruction loading sequences. These instruction loading sequences are maintained by a host processor that provides overall control of the parallel processors, and uses the equivalent of the interprocessor communication unit to communicate with each of the parallel processors in a manner that is known with respect to parallel processor implementations generally. The host processor can be implemented on the same monolithic integrated circuit chip, or die, or off-chip. There are also custodian tasks that need to be performed, such as variable length encoding, after the pixel data has been processed. The computation of these tasks can easily be integrated on the same chip, as their computation requirements are much more relaxed compared to that of the pixel level processing.

Figure 3:
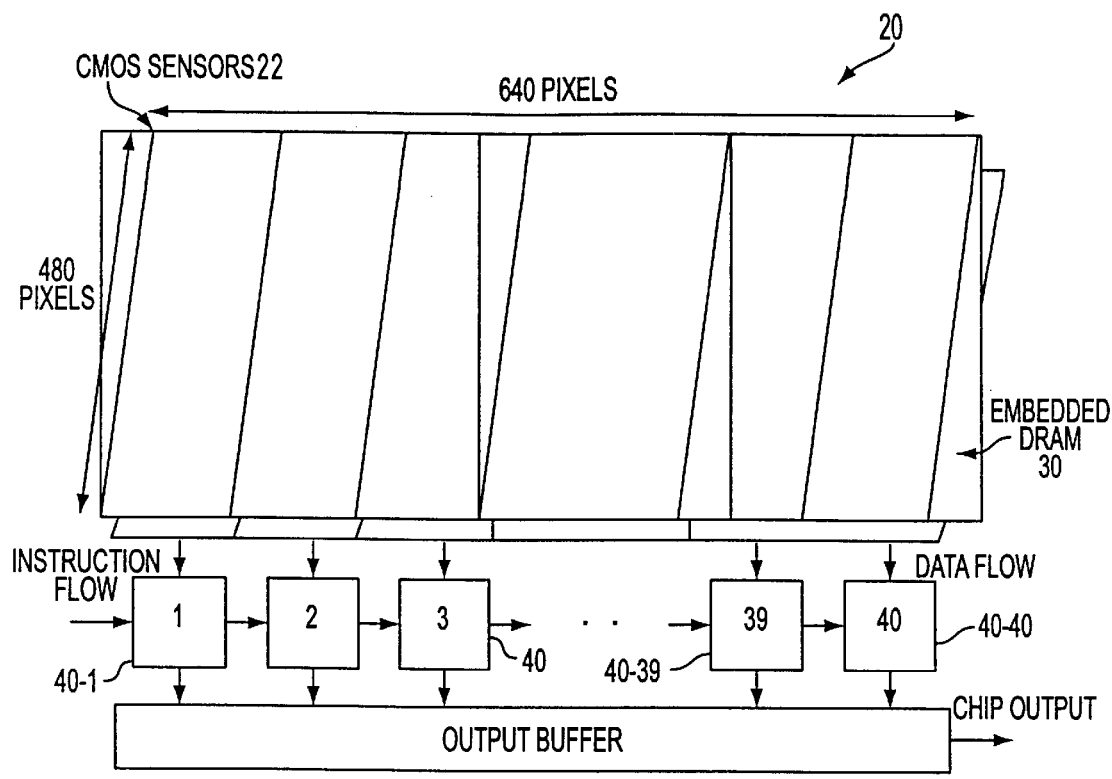
FIG. 3 illustrates a single integrated circuit containing an image sensor array, parallel processors, and embedded memory capable of encoding sequential images according to the first embodiment.

The descriptions provided hereinafter, which are of a first specific preferred embodiment shown in block diagram form in FIG. 3, are also not intended to be interpreted as showing only a single particular embodiment, but rather the descriptions provided with respect to this embodiment are intended to illustrate that the parallel processors, operating concurrently on various portions of pixel data, can be configured in a variety of ways, since the operations described that these parallel processors operated upon are the most computationally difficult. Accordingly, many modifications can be made and still be within the intended scope of the invention. With reference to this embodiment illustrated in FIG. 3, the parallel processor and imager system 20 according to this first embodiment of the present invention exploits the parallelism inherent in video processing algorithms, the small dynamic range used by existing video compression algorithms, the digital CMOS sensor technology, and the embedded DRAM technology to realize a lower power, single-chip solution for low-cost video capturing. Thus, the invention enables capture and processing of video data on the same chip. The acquired video data is stored directly in the on-chip embedded DRAM, also termed pixel memory 30, which serves as a high-bandwidth video frame buffer. The bandwidth of embedded DRAM can be as high as 8 Gbyte/s, making it possible to support several (40 in this preferred first embodiment described herein) parallel video processors. It should be noted that the preferred first embodiment is described with respect to a particular implementation, including a configuration in which each processor is limited to 16 bits. This description is not intended to be limiting, as many alternative configurations are possible, as will be apparent. For low power purposes, these parallel processors are designed to run at relatively low clock rates described further hereinafter, thereby allowing total computational throughput as high as 1.6 BOPS while consuming less than 40 mW of power.

FIG. 3 also illustrates one layout of the CMOS photo sensors 22, the embedded DRAM 30, and the parallel DSP processors 40-1 to 40-40 on a single integrated circuit chip 20. The CMOS photo sensor array 22 are disposed on a top layer of the integrated circuit chip in such a location where they will be able to receive incident light, and include, for instance, photo diodes, A/D converters, and A/D offset correction circuitry. The embedded DRAM or pixel memory 30 resides under the photo diodes and provides storage for the current and two past frames of captured image, as well as intermediate variables such as motion vectors (MV's) and multi-resolution pixel values. The parallel video processors 40 are located next to the imaging circuitry and each operates independently on a 16 column of pixels.

The specific first embodiment of the processor system 20, as described herein, has the advantage of supporting high computational throughput at low clock rates when executing highly repetitive operations. It is less efficient when operating on more complex algorithms that require access to data outside of the processor domain. The size of the processor domain is, therefore, an important design parameter, which requires careful examination of the types of video processing algorithms, as described hereinafter.

Processor system 20 is described herein with reference to its structure, and then described with reference to how this structure can implement three algorithms commonly used in video coding standards: RGB to YUV conversion, DCT, and motion estimation. RGB to YUV conversion is performed on the pixel level and requires no additional information from neighboring pixels. It is computationally intensive, requiring multiple multiplies and adds per pixel, but can be easily achieved with a parallel architecture. DCT, on the other hand, is performed on a block basis. It operates on a row or a column of pixels in each pass and requires bit reverse or base offset addressing to simplify the instruction set. Implementing DCT with a pixel-level processor domain would be unnecessarily complicated.

Similar to DCT, motion estimation works best with a block-level processor domain. Unlike DCT in which processing variables are confined within a block, motion estimation requires access to adjacent blocks regardless of the size of the processor domain. The extent of the locality of interprocessor communication depends on the search space. In this processor design, a search space between processor domains is assumed. No assumption is made with the size of the search space within a processor domain. Furthermore, some motion estimation procedures do not require any multiplication other than simple shifts, as in the example below.

These algorithmic constraints place certain requirements on the design of the parallel processor. In short, the computational throughput (less than 1.6 BOPS based on the algorithm proposed by Chalidabhongse and Kuo in Junavit Chalidabhongse and C.-C. Jay Kuo, "Fast Motion Vector Estimation Using Multiresolution-Spatio-Temporal Correlations", *IEEE Transactions on Circuits and Systems for Video Technology*, Vol.7, No.3, pp. 477–488, June 1997) required for motion estimation results in the most effect size being 16 pixels for each processor with the given technology (preferably less than 0.2 m) and the clock rate (preferably less than about 40 MHz). Special addressing modes such as bit reversal, base-offset, auto increment, and modulo operations are needed for DCT and motion estimation. Interprocessor communication circuitry is needed to access data between processor domains and to communicate domain-specific information such as MV's and reference blocks for block search.

In addition to constraints posed by the algorithms, physical and technological limitations are also considered. In the physical layout, each CMOS photo diode has a dimension of 10 $\mu$m×10 $\mu$m. With 16 pixels per processor, each processor is preferably limited to a width of 160 $\mu$m. This limits the datapath to 36 bits for the arithmetic unit, assuming that the individual ones of the parallel processors are staggered so that certain processing units in the datapath can be made wider. With staggering, the width dimension can at most double at the cost of more complicated layout and routing. Although the embedded DRAM can sustain high memory throughput via large data buses (64 bits), the access time of the embedded DRAM with a 3.3 V supply is twice as long as the cycle time (50 ns). A DMA (direct memory access) unit is introduced to serve as an interface between the DRAM and the local memory units, as described hereinafter. In addition, the DMA unit may communicate with adjacent processors to access pixel data outside of the processor domain.

Finally, an important algorithmic distinction is made with data dependency. As the local program memory space is severely limited, it is desirable to partition the program code such that individual code segments can be stored locally. It is also advantageous to partition the program code based on data dependency. A data-independent algorithm enables codes to be executed in a predictable manner. A data dependent algorithm has an unpredictable program flow and, therefore, would require the attention of individual processors. By partitioning the code into data independent and dependent segments, it is possible to store data independent codes outside of the processor and only to store data dependent codes local to the processor. Data independent instructions can be stored on a much larger program space either on-chip or off-chip and instructions would be sequentially pipelined into the individual parallel processors. If instructions are not so pipelined, a large memory bandwidth to the central program store is required. Program flow control such as branching can be performed outside of the parallel processors. This reduces unnecessary energy overhead to perform program decoding in the parallel processors, which, consequently, gets multiplied by the number of parallel processors to account for the total consumed power. Most image transformation and filtering algorithms are data independent. DCT and color conversion are such examples. A portion of the motion estimation algorithm is also data independent. It is, however, data dependent during MV refinement where local searches are required, as will be described hereinafter.

Figure 5:
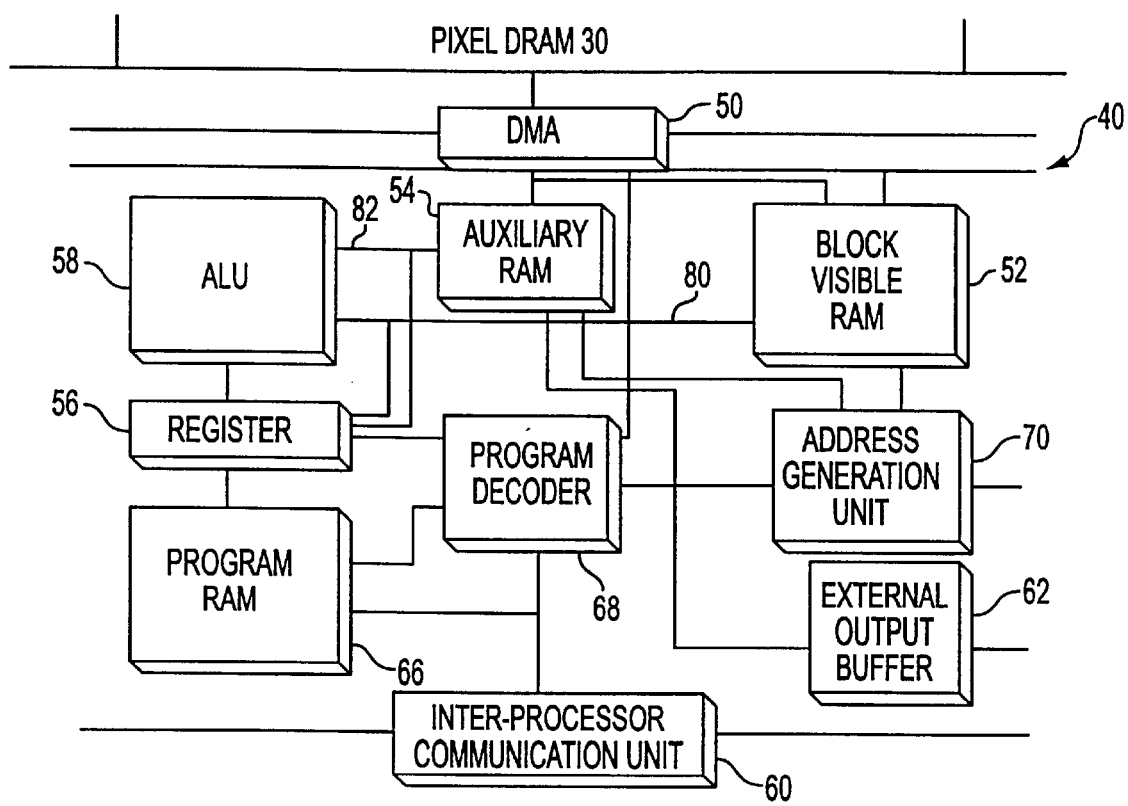
FIG. 5 illustrates a more detailed diagram of one of the parallel processors for the embodiment described in FIG. 3.

The single chip parallel processor and image system of FIG. 3 according to the present invention achieves the following three goals simultaneously: realization of the image/video processing algorithms; minimization of DMA accesses to the pixel DRAM; and maximization of computational throughput while keeping the power consumption at a minimal level. Minimizing DMA access to the pixel memory is crucial not only to reduce power consumption, but also to reduce instruction overhead incurred with access latencies. Each processor 40 as illustrated in FIG. 5 described herein contains a DMA 50, a 288-byte block visible RAM 52, a 36-byte auxiliary RAM 54, a 32-word register file 56, an ALU 58, an inter-processor communication unit 60, an external IO buffer 62, and the processor control unit 64. The processor control unit 64 consists of the program RAM 66, the instruction decoder 68, and the address generation unit 70.

To realize the image/video processing algorithms, the proposed parallel processor and imager system 10 supports certain types of addressing modes and data flow between memory units mentioned above. For color conversion and DCT, there is no need to access adjacent pixel memories. Transfer of data from the pixel memory 30 to local memories are implemented with a simple DMA. Local memory and addressing mode requirements are implemented as described hereinafter. Two-operands single cycle instructions can be realized with two data paths 80 and 82 to the ALU 58, a path 80 from local pixel storage (block visible RAM 52) and a second path 82 from coefficients storage (auxiliary RAM 54 or the register file 56). Automatic post increment and offset addressing modes are available.

For motion estimation, data flow involves adjacent pixel memories. Depending on the motion estimation algorithm used, data flow may involve pixel memories that are two processor domains away. The motion estimation algorithm can be partitioned into four main sections: subsampling, hierarchical and multiresolution block matching, MV candidate selection, and MV refinement. The data flow for subsampling and hierarchical resolution reduction is restricted to the current processor domain. Block matching requires access to adjacent pixel memories. Also, MV candidate selection may require access to data stored two processor domains away. The proposed processor enables these types of data flow by employing special DMA, local memories, and addressing schemes, as will be described hereinafter.

The DMA 50 illustrated in FIG. 5 is the primary interface between the parallel processor's local memories (i.e., auxiliary RAM 54 and block visible RAM 52) and the embedded pixel DRAM 30. It is also the primary mechanism for inter-processor data transfer. The DMA 50 separates the task of pixel memory access from the parallel processors such that DRAM access latencies do not stall program execution. The DMA 50 also supports memory access requests from pixel DRAMs that lie within two processor domains. Access requests that involve two processor domains are not optimal and are meant only for retrieving small amounts of data.

The DMA 50 is implemented in the preferred first embodiment described herein with four access registers and memory buffers as is conventional. Each memory access consists of a 64-bit (8 pixels) packet. Access requests are pipelined along with the instructions into the access registers and they are prioritized in a first-come, first-served fashion. Memory buffers provide the temporary storage needed for the DMA to work with both 64-bit (DRAM) and 8-bit (SRAM) data packets. An access request contains information such as the source and destination addresses, the relative processor domain "read" ID, the relative processor domain "write" ID, and the read/write block size. A status flag is associated with each DMA access register to indicate access request completion. This flag is used in conjunction with a wait instruction to allow better program flow control. Program flow control is necessary during external pixel DRAM accesses, especially during data-dependent processing.

The DMA 50 resolves access contention from the on-chip or off-chip host processors, as previously described, by placing the request in a FIFO queue. External access requests are treated with equal priority by the DMA 50 as the internal access requests. However, each DMA 50 has a limited FIFO queue and if full, new DMA access requests will be stalled and so will the processor 40 issuing the request. To keep track of accesses to pixel DRAM's 30 that are two processor domains away, a relative processor ID and a backward relative processor ID is appended to each access request.

Two special addressing schemes are available for the block visible RAM 52. The block visible RAM 52 is used to provide temporary storage for a block of up to 16×16 pixels of 9-bit wide data for motion estimation and 8×8 pixels of 18-bit wide data for IDCT to comply with the IEEE error specifications. These addressing schemes provide additional flexibility to facilitate local memory accesses and to reduce DMA overheads, as described hereinafter.

Figure 7A:
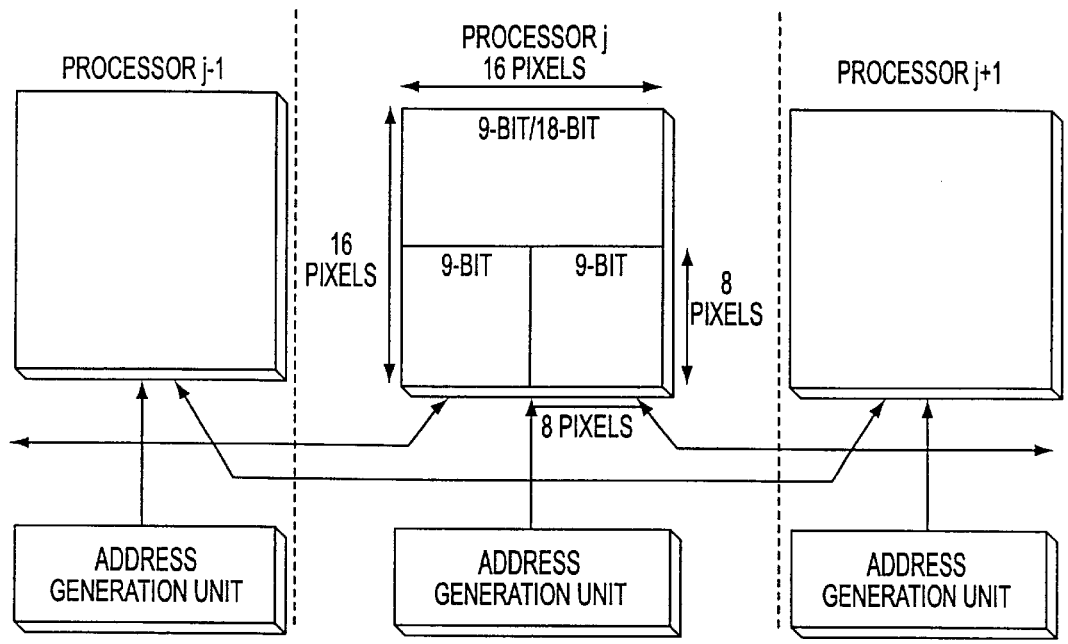
FIGS. 7A and 7B illustrate alternative addressing schemes that can be used with the parallel processors operating upon columns of pixel data according to the first embodiment.

The first addressing scheme is called block visible addressing and is illustrated in FIG. 7A. It enables the block visible RAM 52 in one processor (such as 40-3) to be readable by adjacent processors (such as 40-2 and 40-4). This is especially useful in operations that involve access to a block of data stored in the block visible RAM 52 of adjacent processors. It is specifically used in data independent mode; otherwise, the data stored in adjacent block visible RAMs cannot be predetermined. Being able to address data from adjacent block visible RAMs 50 has the advantage of providing a second level of inter-processor data communication without the cost of performing external DMA accesses. The cost of utilizing this addressing scheme is an increased number of SRAM reads per cycle to avoid memory access contentions. However, it is justified due to a much larger energy and latency overhead associated with DMA accesses. Also, this addressing scheme reduces chip area, a result of reusing the block visible RAM 52.

Figure 7B:
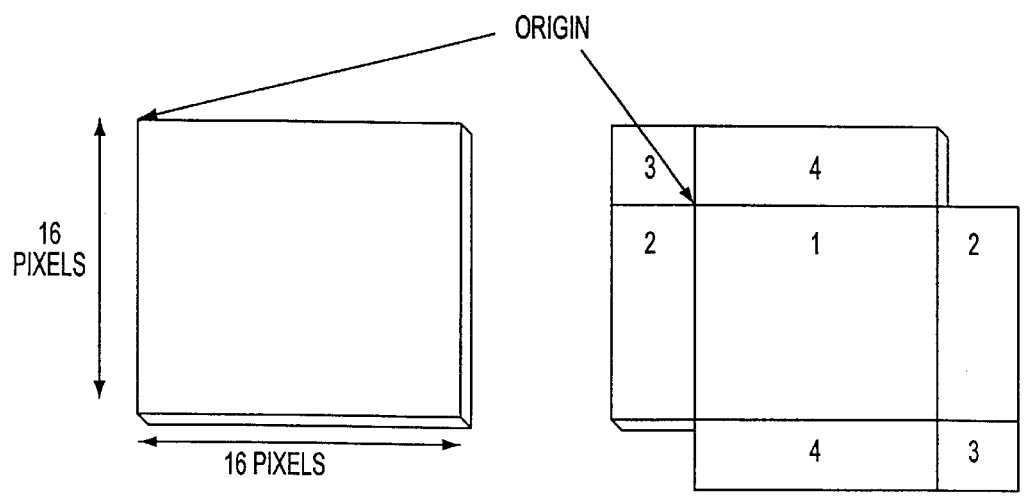

The second addressing scheme is called modulo offset addressing and is illustrated in FIG. 7B. It involves an automatic modulo offsetting of the addresses issued to the block visible RAM. This addressing scheme may work in both data dependent and independent modes. The block visible RAM 52 and the auxiliary RAM 54 are addressed by two address pointers, each pointer representing a coordinate in the cartesian coordinate system with the pointer address being generated from the processor 40, the DMA 50, as well as the address generation unit 70. This data address representation is more suitable for image processing due to the 2-dimensional nature of images. In addition, this representation supports more flexible addressing modes such as auto increments and modulo in both x and y directions.

The modulo offset addressing scheme augments the 2-D address representation by allowing all addresses to be offset by an amount preloaded into the two offset registers (one for each dimension). There are two advantages for using this addressing scheme. First, all address pointers are relative to the offset coordinates (i.e., the offset coordinates are treated as the origin). This allows a program to be reused for processing another set of pixels by simply modifying the offset values. In data dependent mode, this may result in a smaller code size needed to be stored in the local program RAM 66. The second advantage lies with a reduction of DMA accesses to external pixel DRAM. During block search, blocks of 16×16 pixels belonging to the previous frame need to be read from the pixel memory and stored in the block visible RAM 52. Almost all blocks used in block search require external pixel DRAM access. However, since consecutive blocks that are retrieved from the pixel DRAM 30 are displaced by only a few pixels, it is costly to re-read pixels in the overlapped region. DMA 50 accesses to external pixel memories 30 are inefficient since they contend with adjacent DMA's for memory bandwidth. The modulo offset addressing scheme offers a simple implementation to reuse pixel values in the block visible RAM 32. Offsets may be modified to reposition the origin to point to the coordinates of the new block. Only non-overlapped pixel regions between the previous block and the current block need to be updated with DMA accesses. These DMA updates may be interleaved into the search algorithm (since a 16×16 block search requires a minimum of 256 cycles to calculate the error metric) to reduce DMA access latencies. Note also that the modulo offset addressing not only modifies the address pointers, but also the ones generated by the DMA 50. Therefore, DMA access requests can remain the same in the program code.

The modulo offset addressing is available for both data dependent and independent operations. On the other hand, the block visible addressing is available only during data independent mode. Visibility can be turned off to reduce the power consumption induced by multiple reads issued to the block visible RAM.

The auxiliary memory 54 in the first preferred FIG. 5 embodiment being described herein is a 4×8 by 9-bit SRAM used to provide a second pixel buffer for operations that involve two blocks of pixels (i.e. block matching). It provides the second path 82 to the ALU 58 for optimal computational efficiency. It can also be used to store lookup coefficients that are 9-bit wide during non-block matching operations. The auxiliary memory 54 does not support the two addressing schemes available to the block visible RAM 52 since it is used to store pixel values primarily from the current processor domain. Its role in block matching is to buffer the reference block, which remains constant throughout block search. The auxiliary memory 54 and the block visible RAM 52 are the only two local memories accessible by the DMA. The auxiliary memory 54 also serves as a gateway between the processor 40 and the external I/O buffer 62. Data from the processor 40 can be transferred to the external I/O buffer 62 which communicates with the I/O pins (not shown).

To compliment the 9-bit local SRAM units that make up auxiliary memory 54, a 32 word, 18-bit register file 56 is available. The register file 56 provides a fast, higher precision, low power workable memory space. The register file 56 has two data paths 84 and 86 to the ALU 58 allowing most operations to be performed by the ALU 58 and the register file 56. It is large enough such that it can also store both lookup coefficients (e.g. DCT coefficients) and system variables.

Figure 6:
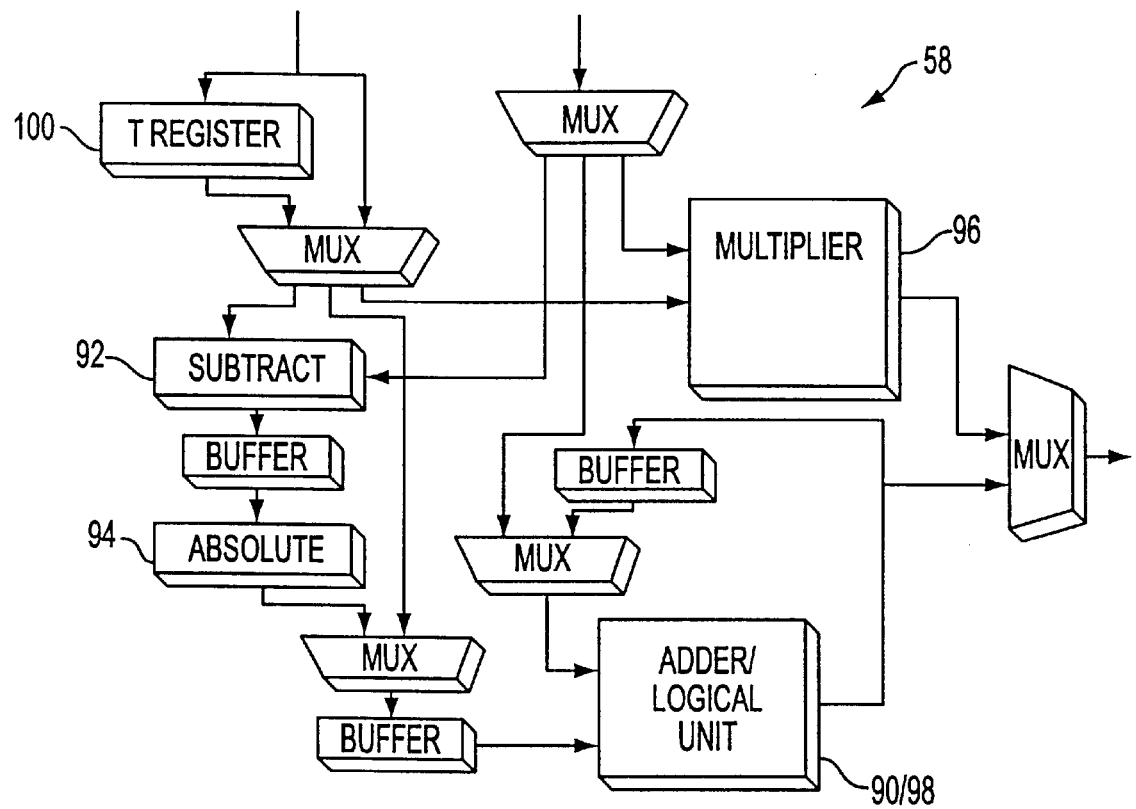
FIG. 6 illustrates a more detailed diagram of one embodiment of an arithmetic logic unit for the embodiment described in FIG. 5 according to the present invention.

The ALU 58 illustrated in FIG. 5 has limited complexity due to the constraints on area and power. The ALU 58 is implemented, as shown in FIG. 6, with a 36-bit carry select adder 90, a 9-bit subtractor 92, a conditional signed negation unit 94 (for calculating absolute values), a 16×17 multiplier 96, a bit manipulation logic unit 98, a shifter 100, a T register 100, and a 36-bit accumulator 102. Operations involving addition, shifting and bit manipulations can be executed in one cycle. The calculation of the absolute error involves the 9-bit subtractor 92, the conditional signed negation unit 94, and the adder 90. Operations are pipelined in 2 stages such that one subtract-absolute-accumulate (SAA) instruction can be executed every cycle. The first stage consists of the 9-bit subtraction and conditional signed negation, and the second stage involves accumulating the absolute differences. The T register 100 is used in conjunction with the SAA instruction, primarily for algorithmic power reduction. The T register 100 can be preloaded with a pixel value from the auxiliary memory 54 and depending on the algorithm, it can be reused without incurring SRAM memory access energy overheads. Finally, the hardware multiplier 96 is implemented to perform the DCT and IDCT efficiently.

The inter-processor communication unit 60 illustrated in FIG. 5 is responsible for instruction pipelining and processor status signaling. Instructions are pipelined from one processor 40 to the next and they may be executed immediately or stored in the program RAM 66 depending on whether the processor 40 is operating in data independent or dependent modes, respectively. In a data dependent mode, execution of the code stored in the program memory 40 occurs immediately after the first instruction has been buffered. Execution of the code segment ends when an end-of-program instruction is reached. At this point, a status flag is set to indicate code completion and the processor 40 halts until a new instruction clears it and forces the processor 40 to operate in data independent mode. The central controller (not shown) reinitializes instruction pipelining when it determines that all processors 40 have completed execution. In data independent mode, the task of address generation may be handled by the central controller in order to reduce power consumption.

With the construction described above, the individual parallel processors 40 according to the first preferred embodiment of the present invention consume less than 1 mW of power at a clock rate of 40 MHz, amounting to approximately 40 mW of total power consumption. An estimated cycle count per processor per frame needed for each encoding/decoding step is provided in FIG. 11. The number of cycles necessary to perform IBBPBBPBB MPEG-2 encoding at 30 fps is estimated to be 35 MIPS for each processor 40. The utilization of the functional units within the processor 40 is approximately 40% for the adder, 6% for the multiplier, 50% for the subtract-absolute-accumulate unit, and 4% for DRAM memory accesses. The processor area is approximately 160 um by 1800 um.

Appendix A outlines the pseudo code for implementing the RGB to YUV conversion. This pseudo code is provided as one exemplary way in which the processors 40 can implement these and other algorithms.

Second Preferred Embodiment

A second preferred embodiment of the present invention is suitable for use in, e.g., digital video cameras and the like. Preferably, this embodiment implements a digital video (DV) compression technology. DV may be viewed as a fundamentally different compression technology than MPEG2 in that the two are designed to support applications in diverse domains. Whereas MPEG2 supports a relatively high compression ratio of more than 100:1, which is suitable for video conferencing and video archiving where bandwidth is limited. However, MPEG2 is not resilient to error propagation due to a strong dependence on past image when decoding a current image. DV, on the other hand, is developed for acquisition of video where a high-capacity video storage medium is assumed. It exhibits compression ratio of approximately 3:1 to 5:1 and is suitable for application such as digital camcorders, digital broadcasting and video editing. These applications and the physical constraints requires that the DV standard be highly robust to bit errors and allow for quick access to stored data via trick plays, (e.g, high speed, bi-directional linear searches). This is achieved with independent coding of macroblocks and a feedforward compression scheme.

Figure 11:
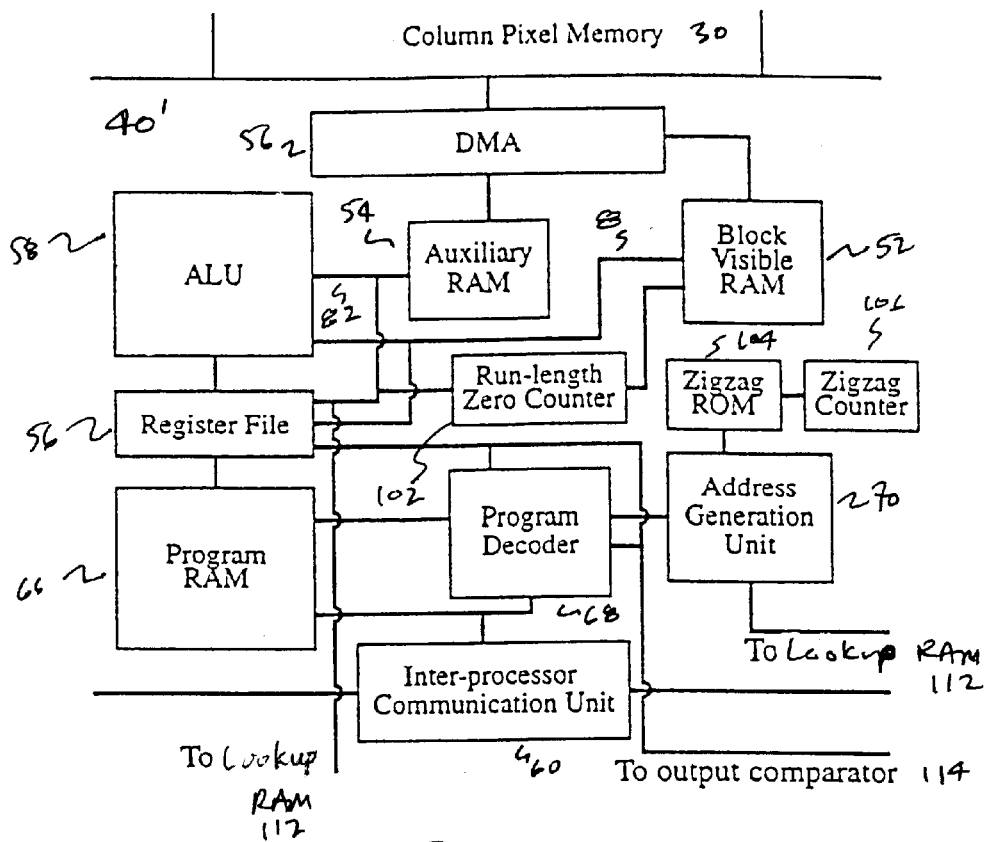
FIGS. 11 and 12 illustrate the manipulation of data in a DV algorithm implemented by the second embodiment.

The DV encoding algorithm is based on a feedforward video compression scheme. A DV image (typically 720×576 pixels) is first formulated into macroblocks each containing 8×8 pixel blocks of four luminance (Y) blocks and two chrominance blocks, Cr and Cb. In the 625/25 system, 4:2:0 color subsampling is employed. Five macroblocks are put together to form a segment. These 5 macroblocks are shuffled, i.e., taken from different parts of the image as shown in FIG. 11. Motion adaptive discrete cosine transforms (DCTs) are performed on each of the 8×8 blocks in the macroblocks. These macroblocks then undergo error correction coding and channel modulation, are formatted into synchronization blocks and finally redistributed, "remapped" into superblocks (a cluster of 3×9 macroblocks). These superblocks are then mapped into tracks and written to the cassette medium.

The motion adaptive DCT employs a motion detector from which a motion indicator signal is generated. Based on this indicator, one of two types of DCT algorithms, a standard 8×8 DCT algorithm or a motion-based DCT algorithm, is applied. The motion-based DCT algorithm performs the normal DCT algorithm on the vertical pass. The resulting DCT block and the corresponding motion indicator are fed to the feedforward adaptive quantization unit.

The goal of the feedforward adaptive quantization is to control the post-compressed bit rate such that the compressed data from different segments is approximately fixed rate (as required by trick plays, e.g., searching and the like. The feedforward quantization unit first computes the activity (i.e., energy level or information content) of the DCT block. This activity value is used to select the quantization class associated with the block. There are four quantization classes and sixteen quantization strategies used in the DV standard. After a quantization standard is chosen, the corresponding quantization strategies are used to quantize the DCT block. The sixteen quantized DCT blocks are variable length-coded and the total word lengths of the variable length codes are extracted. These word lengths are combined with word lengths from other macroblocks belonging to the same segment to calculate the segment data rate. A quantization strategy is chosen which corresponds to the segment data rate (calculated based on that quantization strategy) that is closest to the ideal fixed segment data rate. Lastly, the entire segment is quantized with the chosen quantization strategy before DV streaming (error/channel coding and formatting).

Figure 9:
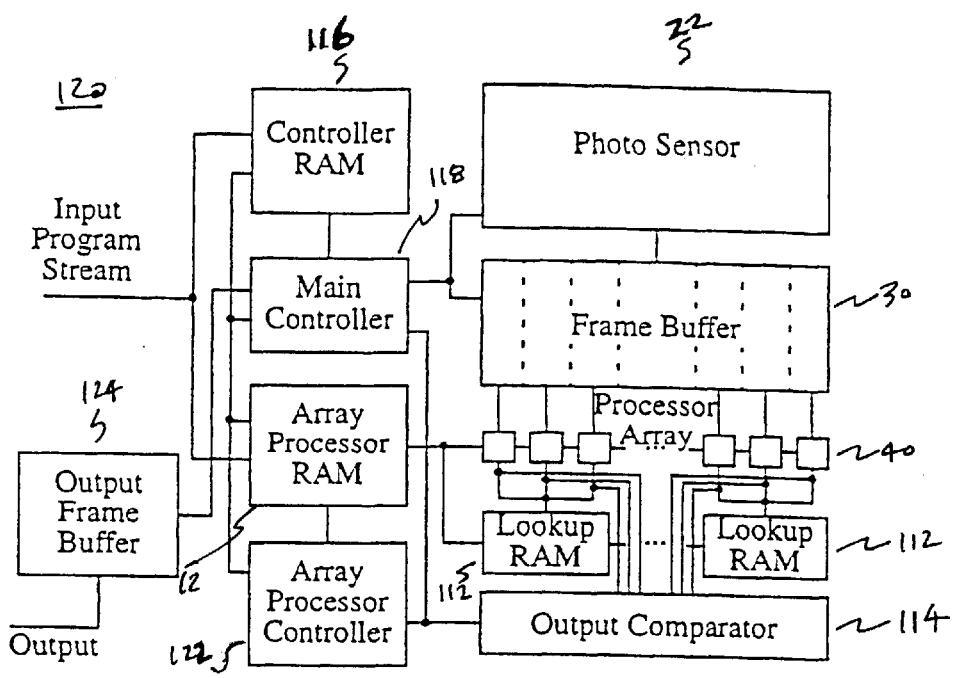
FIG. 9 illustrates the overall architecture of a digital CMOS camera according to a second preferred embodiment of the present invention.

An overall architecture of the second preferred embodiment implementing the DV algorithm is shown in FIG. 9. Here, the photo sensor array 22, DRAM frame buffer 30 and processor array 40' are similar to those in the first embodiment, and a significant aspect of the second embodiment lies in the way it uses external peripheral control circuitry such as main controller 118, array processor controller 122, output comparator 114 and lookup memory 112 to process and control the image data from the array processor elements 40' to reduce overall system power consumption and provide an integrated, single-chip processing solution delivering ready-to-use data formatted to the DV standard.

The frame buffer 30 consists of embedded DRAM to buffer images at high density. The frame buffer 30 is partitioned into 45 columns. This results in a column width of sixteen pixels. Each column is separately addressed and accessed by an individual processor element 40' in the processor array. An intrinsic advantage of using such a processor configuration for image processing is that processing constraints of individual processor elements 40' are not affected by horizontal scaling of the image resolution. It is also possible to scale image resolution vertically by placing processor elements 40' on the other side of the photo sensors and partition the sensor vertically in two.

Of course, it will be readily apparent to those skilled in the art that the second embodiment need not implement the DV standard and may instead implement an MPEG2 protocol as described above in connection with the first embodiment or another image processing algorithm. Examples of algorithms that may be implemented by the embodiment are color conversion, gamma correction, two-dimensional FIR filtering, quantization, sub-band coding, variable length coding, white balancing, DCT/DICT, color space conversion, motion estimation, color subsampling, and median filtering, as will be readily apparent to those skilled in the art. Also, as before, the specific parameters used to implement the embodiment such as number of array processor elements 40', size of frame buffer 30 and size of photo sensor 22 and the like will be to some extent (large or small) dictated by the implemented protocol or by the design choices in view of a particular application. Thus, this explanation should not be interpreted as limiting on the claims beyond the extent recited in the claims; rather, it should be interpreted as an illustrative example of a wide variety of processing systems.

To control the camera chip, an instruction stream is fed into the chip. This instruction stream is composed of two multiplexed instruction streams, one to control the main controller 118 and the other to control the array processor controller 122. The different types of instruction streams are demultiplexed and stored in separate physical memories, the controller RAM 116 and the array processor RAM 120. The demultiplexing of instructions is controlled externally using an address bit. The particular method for gauging the instruction feed is not specified. The instruction stream feed can be controlled externally, it can consist of a cached system in which instructions are provided on an as-needed basis, or it can be controlled by the main controller as will be readily apparent to those skilled in the art. During an instruction feed, the main controller 118 and the output comparator-main controller communication are stalled. The array processor controller 122 pipelines a NOP to the array processor elements 40' but is otherwise unaffected.

Main Controller 118 and Array Processor Controller 122

The two controllers, the main controller 118 and the array processor controller 122, control signal and data flows for the entire camera chip. The main controller 118 is the primary controlling unit whereas the array processor controller 122 performs simple decoding function to pipeline instructions to the processor elements 40'. The main controller 118 oversees the control of the sensor array 22, the frame buffer 30, the array processor controller 122, and the output comparator 114. It performs tasks such as resetting the sensor array 22 and the frame buffer 30 as well as initializing the array processor controller 122. For example, the main controller 118 can specify when the array processor controller 112 starts and stops issuing instructions and can modify the array program controller 122 program counter value.

In addition to performing control monitoring, the main controller 118 also processes data sent from the processor elements 40' through the output comparator 114. This allows a single controlling unit to handle output formatting as well as streaming protocol, thereby reducing programming effort for streaming synchronization. The main controller 118 is separated from the processor element 40' instruction pipelining control for the reason that the main controller 118 is needed to perform post-processing of compressed data. This separation enables the main controller 118 to run in parallel with processor element 40' instruction pipelining. In addition, this separation also implies a separation of coding tasks into processor element 40' programming and main controller 118 programming which results in the separation of the physical memory spaces for storing processor element 40' and main controller 118 program codes. To reduce the amount of controlling overhead, the array processor element controller 122 performs simple branching and pipelining of instructions while the main controller 118 performs an overall monitoring of the processor element 40' program flow and processing status. This control overhead to the main controller 118 is small compared to the processing overhead needed to post-process the compressed data produced by the processor elements 40'. As a result, an additional control unit for monitoring the processor element 40' program flow is not required. Also, since the main controller 118 does not have direct control over the processor elements 40', the main controller 118 needs to access status information from the processor elements 40' via the output comparator 114 and interprets the result to oversee the program flow of the processor element 40' instruction pipelining.

The array processor controller 122 is unique in that it only performs simple looping of program flow. It operates in conjunction with the first (leftmost) left most processor element 40' to perform branching, meaning that the computational units of the first processor element 40' will provide the array processor controller 122 with the branch status information by setting the array processor controller 122 status flags.

Most array processor controller 122 instructions are pipelined directly to the array of processor elements 40' except for branching and special processor control instructions. The special processor control instructions enable the array processor controller 122 to set main controller 118 status flags and send control information to the main controller 118 via main controller 118 registers. This enables a simple user-programmed synchronization point between the main controller 118 and the array processor controller 122 to indicate to the main controller 118 the extent of processor element 40' processing. Otherwise, the main controller 118 program flow is independent of the array processor controller 122 program flow. This is specified such that the main controller 118 can compute in parallel with processor element 40' instruction issuing.

An example of synchronization signaling between the array processor controller 122 and the main controller 118 is as follows. The array processor controller 122 reaches a user-defined point where it requires main controller 118 oversight. The array processor controller 122 stores an identification number into a control point register and either sets a status flag or issues an interrupt to the main controller 118. The control point register and the array processor controller 122 status register are shared between the main controller 118 and the array processor controller 122 such that both units can access them. The main controller 118 will either poll the status flag or contain an interrupt service routine that will identify the control point and provide the needed oversight service.

Array processor controller 122 instruction issuing is performed in parallel with main controller 118 control to allow the main controller 118 to perform post-processing.

The array processor controller 122 performs simple branching based on feedback from the first processor element 40'. Branching at the array processor controller 122 level is desirable since most branching in image processing is data dependent. This means that branching required by individual processor elements 40' is, most of the time, uniform. For example, color conversion involves a 3×3 matrix product with RGB color values of every pixel in an image block. After calculating the converted color values of a given pixel, the same computation must be performed on the remaining pixels. This means that the same instructions that perform the matrix product can be applied to each pixel. Repeating the instructions can be done at three levels. The lowest level is at the processor element 40' level, meaning that instructions are stored locally in the processor elements 40' and the processor elements 40' will perform the branching. The next level is at the array processor controller 122 level as described above. The highest level is at the main controller 118 level in which the main controller 118 monitors branch status of the processor element 40' computation. The most suitable level is the array processor controller 122 level, since it is the most area and power efficient. It is highly undesirable to store instructions in each processor element 40'. Storing instructions in each processor element 40' requires more memory and requires individual processor elements 40' to perform instruction decoding and branching, resulting in more power consumed. Main controller 118 level branching is avoided because it does not add any benefit to array processor controller 122 level branching. In addition, main controller 122 level branching implies more tightly coupled operation between the main controller 118 and the array processor controller 122 which reduces the computational throughput of the main controller 118 to perform post-processing.

Thus, as seen above, main controller 118 controls the array processor controller 122 program flow start and stop. Array processor controller 122 provides main controller 118 synchronization information. This gives the programmer flexibility to synchronize processing.

To simplify instruction fetching, instructions for controlling the processor elements 40' are pipelined from the array processor RAM 120 from the left-most processor towards the right-most. As noted above, pipelined processor element 40' instructions are stored in separate physical memories 120 from the main controller 118 instructions (stored in memory 116). This partitioning of codes reduces programming complexity by addressing different architectural issues at different levels as described above. Data generated by the processor elements 40' are summarized by the output comparator 114 and fed back to the controlling units 118 and 122. This data can be further processed by either controller 118 or 122 or stored in the output frame buffer 124 for streaming. Lookup coefficients are stored in the lookup RAM 122 shared between a number of processor elements 40' to reduce area as well as power overheads.

Of course, the haphazard addition of surrounding controlling circuitry around the array of processor elements 40' has its disadvantages as well. One such disadvantage is reduced computational throughput and increased complexity to the individual processor elements 40'. For image processing implemented using the second embodiment, however, the amount of controlling overhead is a small fraction of the algorithmic computation due to the iterative nature of the algorithms implemented. Computational throughput is not reduced significantly. In addition, these surrounding controlling circuitry are designed such that the least added complexity is incurred in the individual processor elements.

Output Comparator 114

The output comparator 114 serves as a bridge between the controlling units 118 and 122 and the processor elements 40'. It delivers information both ways and can be used for several controlling as well as data transferring tasks. It is required by DV encoding primarily to transfer bit cost information from the shuffled macroblocks to the main controller 118 to perform an optimal quantization strategy search. It also serves to communicate, to the main controller 118, processor element 40' status information such as processor element 40' execution completion (for data-dependent operations in which program codes are stored in the processor element 40' program memory), lookup pipeline status, etc. It is used by the main controller 118 to communicate the optimal quantization strategy to the processor elements 40'. The output comparator 114 may also be needed in several other image processing algorithms mentioned above. Additional examples include auto whitening and auto exposure control. Although data sharing is required across the entire sensor array, the amount of data transfer is limited, implying that the output comparator 114 is not a significant contributing factor to power consumption.

The output comparator 114 enables the array of processor elements 40' to process algorithms that involve communication between processor elements 40', the main controller 118 and the array processor controller 122 at a global level. The output comparator 114 provides the interface necessary for the main controller 188 to control the array of processor elements 40' at a level where most image processing algorithms required by applications such as digital CMOS cameras can be realized. The output comparator 114 also serves as a global communication unit. It delivers information to and from the array of processor elements 40' and can be used for several controlling as well as data transferring tasks. The output comparator is made use of by DV encoding primarily to transfer bit cost information from the shuffled macroblocks to the main controller 118 to perform optimal quantization strategy search. It also serves to communicate to the main controller 118 processor element 40' status information such as processor element 40' execution completion (for data-dependent operations in which program codes are stored in the processor element 40' program memory), lookup pipeline status, etc. The output comparator 114 is used by the main controller 118 to communicate the optimal quantization strategy to the processor elements 40'. Although data sharing is required across the entire array of processor elements 40', it is a small fraction of the total computational requirement. This consequently implies that the output comparator 114 is not a significant contributor to power consumption. The output comparator 114 can be viewed as a top hierarchy communication unit in support of low-level communication between adjacent processor elements 40'.

Specific functions of the output comparator 114 fall into several categories. One is selective processor element 40' processing. In this category, output buffering and ordering functions include reordering output data from each processor element 40' before sending it to the main controller 118 for post-processing; including processor element 40' status information to allow internal processor element 40' decoder states to be monitored for debugging purposes; controlling information buffering between the processor element array 40' and the main controller 118 so that the main controller 118 may be stalled due to various reasons without stalling individual processor elements 40' due to control signalling and status reporting. The converse is also true when it is desirable for the main controller 118 to issue control information to individual processor elements 40' which will become effective in the individual processor elements 40' when they are ready to accept the new control information.

Selective processing of processor elements 40' also includes processor element 40' execution masking which enables a select set of processor elements 40' to execute the pipelined instruction stream. The remaining unselected processor elements will ignore the pipelined instruction stream. This adds flexibility to accessing the processor elements 40' by trading off computational throughput. This category further includes processor element 40' mode control, in which a status register settable by the main controller 118 and used by all processor elements 40' to identify which of three modes (local program store/execute mode, masked processor element 40' execution mode and instruction pipelining only mode) in which the processor elements 40' will operate.

Another function of the output comparator 114 is to AND the status bits generated by the processor elements 40'. A forty bit mask can be given to the output comparator to give the programmer the ability to selectively monitor the status bits generated by a set of the processor elements 40'. That is, a particular bit in the mask is set to the logical AND of the corresponding status bit in all processor elements 40'. If a given status bit is "1" for all processor elements 40', then the bit in the output comparator 114 mask corresponding to that status bit is set to "1"; otherwise, it is set to "0". This feature can be used, for example, in conjunction with processor element 40' program completion and processor element 40' processing milestone status flags.

Finally, within the selective program element 40' processing category falls input buffering and data transfer. In some instances, it is necessary to send data directly from the main controller 118 to a given set of processor elements 40'. For example, in DV encoding the main controller 118 will determine the quantization strategy based on the bit costs calculated by the processor elements 40'. This strategy information needs to be fed back to the corresponding five processor elements associated with a given macroblock for further processing. One way to feed this information back to the processor elements 40' is through the lookup RAM 112; however, this is too inefficient and can incur a high control overhead. A better method is to send this information via the output comparator 114. This data can be buffered in a main register and copied to multiple registers to avoid fanout issues. A mask can be applied in parallel to specify which processor element 40' can read from these registers.

Another category of functions performed by the output comparator 114 is processor status reporting. For example, a processor element program completion status flag is required for processor elements 40' that are operating in data-dependent mode, i.e., each processor element 40' executes instructions from a copy of program code stored locally in the individual processor element 40'. This flag instructs the array processor controller 122 to issue new instructions when all processor elements 40' have completed processing the locally stored code.

Another example of this type of functionality is the processor element 40' milestone status flag, mentioned above. This is used to notify the main controller 118 that a certain processing step has been reached so the main controller 118 can prepare for the next set of operations in advance. This may be used during post-processing to indicate to the main controller 118 when data will be available. This flag may also be used for debugging purposes. In some instances (in instruction pipeline mode, for example), the milestone status flag can provide handshaking between the processor elements 40' and the array processor controller 122. In this mode, instructions are issued by the array processor controller 122 and pipeline to the processor elements 40'. This enables data-dependent algorithms to be issued at the array processor controller 122 level rather than at the local processor element 40' level. Essentially, the milestone flag is used in a similar fashion as the processor element 40' program completion flag, i.e., to indicate to the array processor controller 122 that a certain point in the program has been reached and that it can proceed to the next set of instructions.

Consider a data-dependent code stored in the array processor controller 122 program memory. What data dependency implies is that if this code were to be executed by the processor elements 40', different processor elements 40' will have different program flows, thus implying different types and amounts of branching. For larger data-dependent program loops, an instruction can be inserted before of after the branch instruction to set the milestone status flag. Once the flag is set, the processor element 40' will stop processing until it receives a start processing instruct. The array processor controller 122 will continue issuing a block of instructions until the output comparator 114 indicates that all milestone status flags have been set. At this point, the array processor controller 122 will move on to the next block of instructions.

Additionally, the output comparator 114 can generate interrupts to the main controller 118 for more tightly coupled processing. The output comparator 114, like the array processor controller 122, provides status register for main controller 118 polling.

The output comparator 114 can be implemented in several different ways to support the functionalities described above. Not all functionalities are needed for a particular image processing algorithm; however, all functions are likely to fine use in one or more algorithm.

Lookup Memory 112

The need to separate the lookup memory 112 from the processor element 40' architecture arises as a result of data dependencies in certain algorithms. Separation of lookup memory 112 is also an area-saving mechanism. Without a separate lookup memory 112, lookup coefficients must be pipelined along with the instructions and stored in the local processor element memories 66. By separating the lookup memories 112 and exploiting the parallel nature of the image processing algorithms, a single lookup memory 112 can serve multiple processor elements 40/.

Separating lookup memory 112 may incur slightly greater overhead circuitry power consumption. This can be seen by comparing the separate lookup memory 112 architecture to an architecture without separate lookup memories 112. Having an integrated lookup memory in the processor element 40' implies that lookup coefficient are pipelined along with the instruction stream. Power will be consumed by pipeline registers buffering the lookup coefficients between the processor elements 40'. Power will also be consumed when the lookup coefficient are read into the processor elements 40' and subsequently processed. With a separated lookup memory architecture, power will be consumed by pipeline registers buffering the lookup coefficient buffer registers that are required in each processor element 40', through added complexity in the interface between the processor elements 40' and the lookup memory 112, and by the processor elements 40' for reading and processing the coefficients. Having a higher processor element to look up memory ratio reduces the power consumed through the pipeline registers but will increase the power consumed by the interface circuitry between the processor elements 40' and the lookup memory 112. This relationship cannot be determined directly.

A separate lookup memory 112 can be a power saving tool. Without a separate lookup memory 112, lookup coefficient will have to be pipelined at the same speed as the processor elements 40' so that the lookup RAM 112 to processor element 40' interface circuitry does not have to be operating every cycle and can instead operate only on an as-needed basis. This means that redundant switching in a non-separate lookup memory architecture can be avoided.

Some of the most significant advantages of separating the lookup memories 112 from the processor elements 40' are providing the processor elements 40' with a much larger lookup space (especially important in algorithms where large lookup tables are required, since it prevents the lookup memories from dominating the size of the processor elements 40'); enabling processor elements 40' to access the lookup memory 112 in data-dependent mode; and, by having an array of lookup memories 112, the data in each lookup memory 112 need not be identical. On the other hand, the main tradeoff of having a separate lookup memory 112 is reduced flexibility in lookup access and a potentially higher power consumption.

Figure 13:
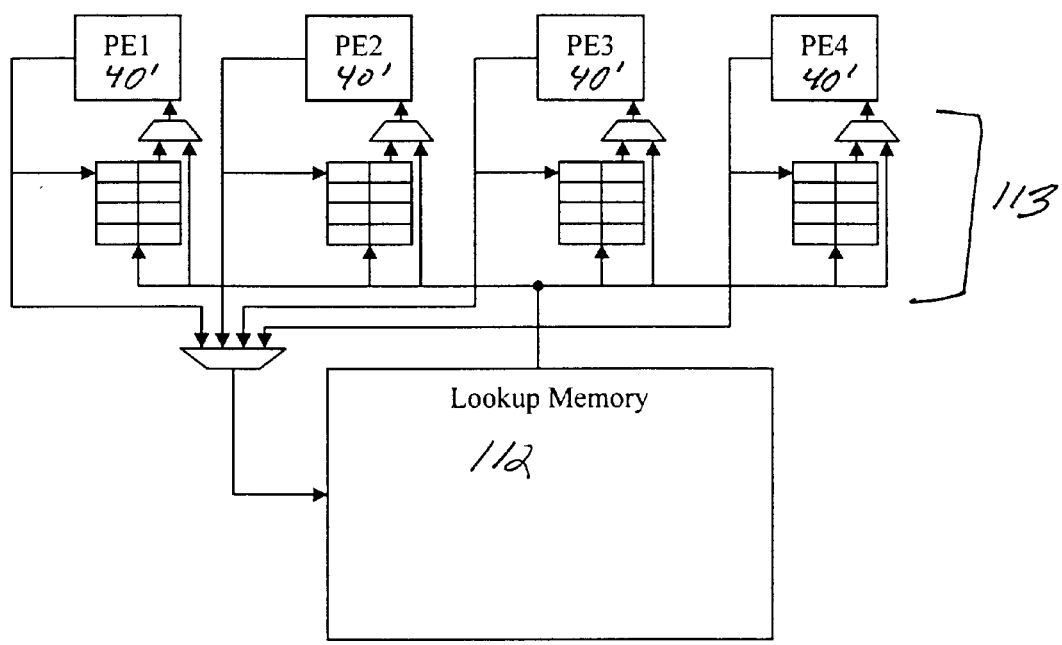
FIG. 13 illustrates a preferred lookup memory architecture according to the second embodiment of the present invention.

The lookup memory architecture used in the second preferred embodiment is designed to support a seamless processor element 40' access during pipelining mode and random access during data-dependent mode. This architecture assumes that even during the data dependent mode, address requests to the lookup memory from different processor elements 40' have a fixed order. For example, in pipeline mode, if a first processor element issues an address A to the lookup memory 112 in the first cycle, a second processor element will issue the same address in the second cycle, a third processor will issue the same address in the third cycle, and so on. In data-dependent mode, this order is not fixed; however, although the processor elements 40' are running independently in data-dependent mode, it is very likely that neighboring processor elements 40' are running slightly out of synchronization and that they will issue address requests to the lookup memory in a fixed order. This ordering may not be 1, 2, 3 . . . as in the pipeline mode. It could be 2, 1, 3 . . . or some other combination. The proposed lookup memory 112 architecture can support full throughput access in this case. This architecture includes a lookup memory 112 busy status indicator and an output buffered (from the perspective of the lookup memory 112) queuing system 113 as shown in FIG. 13. The output queue is a circular queue that that stores lookup coefficients and their corresponding addresses. Each processor element 40' is associated with an output queue and all output queues corresponding to a lookup memory are identical, (i.e., they contain identical information). The address requests issued by the processor elements 40' are first checked against addresses stored in the output queues. If a match occurs, the corresponding queued data is retrieved. Otherwise, the processor elements 40' will be issued to the lookup memory 112. A copy of the address request and the corresponding data retrieved from the lookup memory 112 will be sent to each output queue with the exception of the requesting processor element 40' in which data retrieved is sent directly to the processor element.

Figure 10:
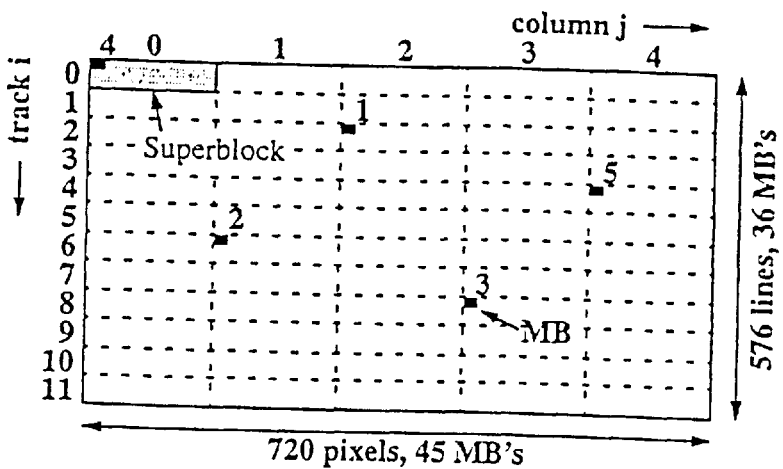
FIG. 10 illustrates a more detailed diagram of one of the parallel processors for the embodiment described in FIG. 9.

The preferred architecture of a processor element 40' according to the second preferred embodiment is shown in FIG. 10. The processor elements 40' in the second embodiment primarily differ from their counterparts in the first embodiment in that they include a run-length zero counter 102, zigzag ROM 104 and zigzag counter 106, provided for use by certain aspects of the DV algorithm as will be described in greater detail below.

Since the DV algorithm does not require access to image data belonging to other image columns, a simple direct memory access (DMA) unit 50 is implemented. The DMA unit 50 serves as an interface between the processor elements 40' and the frame buffer 30 such that the DRAM 30 access time is decoupled from the processing cycle time.

The block visible RAM 52 (16×16 pixels) and the auxiliary RAM 54 (8×8 pixels) provide small but flexible buffering of image blocks. These local memories 52 and 54 are addressed by a 2-D vector address with an optional automatic offset compensation. This provides the flexibility for implementing efficient algorithms such as fast DCT. The block visible RAM 52 can also be used to store 16-bit words. This is needed for temporary storage of the DCT coefficients. The auxiliary RAM 54 provides a temporary buffer for buffering past image pixels for motion detection calculation. It can also store lookup coefficients in case the L-RAM 112 cannot support the bandwidth demanded by the algorithm.

The ALU 58 consists of a 24-bit adder, a 12×12 bit multiplier, a 24-bit barrel shift register, and a 24-bit accumulator. Two datapaths feed the ALU 58 to provide high processing efficiency. Data can be retrieved from the lookup RAM 112, the block visible RAM 52, the auxiliary RAM 54, the register file 56, or the run-length zero counter 102. The register file 56 proves fast and efficient access to intermediate process variables.

Variable length coding and quantization are the most computationally intensive tasks in DV encoding. As a result, it is necessary to include a partial implementation of variable length coding in hardware. The zigzag units 104 and 106 and the run-length zero counter 102 are implemented to reduce the amount of overhead associated with variable length coding. The zigzag units 104 and 106 feed the address generation unit 70 with hard-coded addresses. Two zigzag patterns are stored in the zigzag ROM 104, one for stationary blocks and the other for motion blocks. The run-length zero counter 102 works in conjunction with the zigzag units 104 and 106 to compute run and amplitude pairs. The output of the run-length zero counter 102 can be sent directly to the lookup RAM 112 to perform word length lookup.

The program decoders 68 provide instruction decode as well as simple program flow control. Program flow control is needed only during data dependent processing (e.g., a variable length coding codeword construction). In the data dependent processing mode, the instructions are locally stored in the program RAM 66.

The image column width is sixteen pixels and is chosen based on the width of the macroblocks. By making the column width the same as the macroblock width, less programming overhead is needed to synchronize the transfer of the bit cost, associated with the feedforward quantization, to the main controller 118.

To use the above architecture to implement the DV algorithm, it is important to note that DV requires one full-sized frame and four partial frames of pixel memory. Part of the frame buffer is a luminance frame (720×576) of the past image used for motion detection. The frame buffer also contains three partial frames (described in greater detail below) with a resulting of 720×96 for buffering a portion of the current image in full color. The output frame buffer buffers compressed data which requires four to five times less memory than a full-sized frame. It is approximately 146 kb. The memory requirement for DV is realized with existing embedded DRAM technology.

Figure 12:
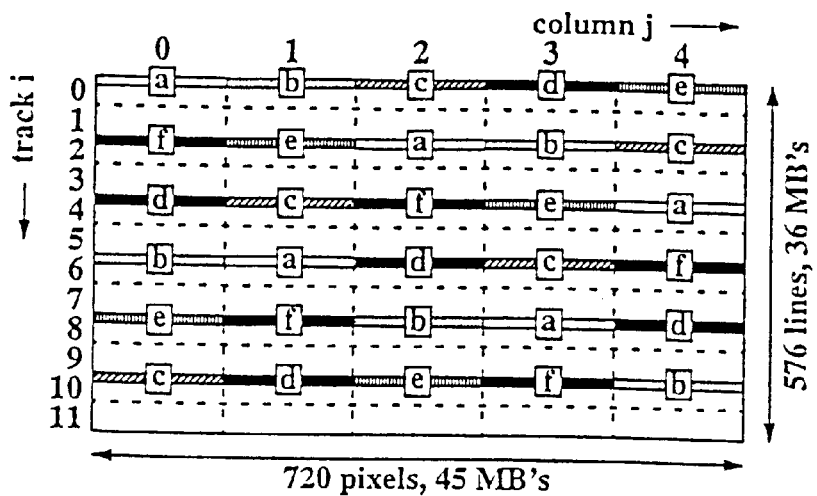

Due to the need to buffer images on-chip, it is strongly desirable to optimize the memory usage for the algorithm at hand without compromising complexity. For DV encoding, buffering of newly-acquired pixels can be a large overhead if the entire image needs to be buffered. An alternative buffering scheme is used in the second preferred embodiment to reduce the amount of buffering by a factor of 6. This scheme is illustrated in FIG. 12. Memory usage of macroblock shuffling is analyzed to determine the minimum amount of memory to buffer the shuffled macroblocks. As shown in the Figure, this requirement is satisfied when six full rows of macroblocks (16×720 pixels=one row of 45 macroblocks) are buffered. This result is obtained by observing the following. First, at any time instance, nine segments are being processed by the processor elements in parallel. If these nine segments are taken from a row of macroblocks within a superblock (1×9 macroblocks), then shuffling requires that four additional rows of macroblocks be retrieved to formulate the segments. Refreshing specific regions in the sensor area introduces two dimensions of addressing overheads. Rather, one dimension (row-wise) addressing overhead can be achieved by computing an entire row (1×54 macroblocks) of pixels before retrieving the next row. Six rather than five rows of macroblocks must be buffered due to the geometry of the shuffled macroblocks.

DV requires greater flexibility and amount of looking up coefficients due to quantization strategy searches. A power-, area- and performance-efficient architectural solution is required to support lookup memory update as well as access. In the second preferred embodiment, shared lookup memories are provided to reduce the power and area overhead, and lookup coefficient are pipelined to reduce routing overhead.

Final packaging and formatting of compressed data requires that the macroblocks be stored in sync blocks, error correction coded and channel modulation coded. It is desirable to incorporate error and channel coding onto the camera chip to reduce the power overhead incurred by data transfer to external processing units. Internally, error correction and channel modulation can be performed either at the controller level or in hardware, since channel encoding hardware is simpler than decoding for error check coding, which is the opposite for source coding.

Thus, one of ordinary skill in the art sees that the architecture of the second preferred embodiment requires a different programming methodology than the conventional single processor and parallel digital signal processor architectures. Programming complexity is often introduced with added architectural parallelism. Complexity in parallel systems normally reside in determining the optimal partitioning of resources and in synchronization of signal flow. The proposed architecture takes advantage of the highly repetitive image processing algorithms and the large-scale parallelism of the processor elements to achieve full utilization of processing resources. The proposed architecture also achieves low programming complexity by separating processing and synchronization codes. This enables programmers to code the processor elements 40 almost independently of the main controller.

Programming complexity can further be reduced by categorizing the data dependency of the image processing algorithm. Data-independent codes can be pipelined and executed by the processor elements on the fly. Also, local execution of data-dependent algorithms incurs controlling overhead at the global level since new instructions cannot be pipelined until all processors 40 have completed local execution. Converting data-dependent codes into data independent codes is an alternative that may offer better performance. As a result, data dependency is correlated with the programming complexity for this architecture.

Figure 4:
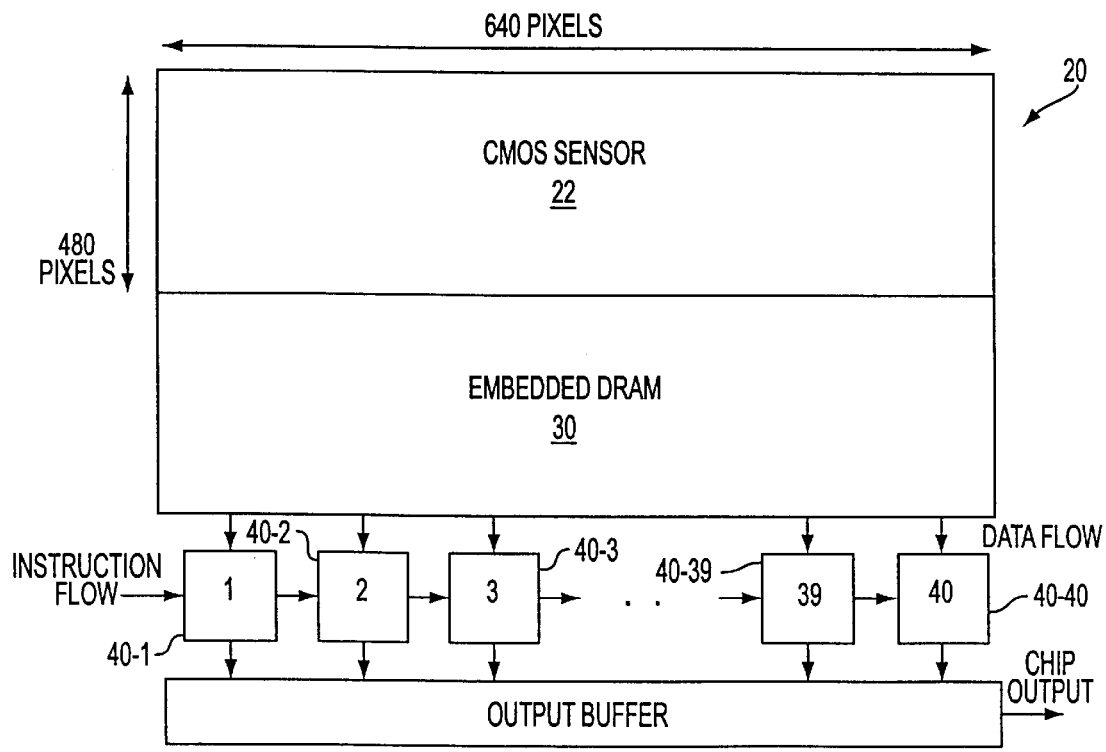
FIG. 4 illustrate another layout of a single integrated circuit for the embodiment described in FIG. 3.

While the present invention has been described with reference to preferred embodiments, variations and modifications may be made without departing from the spirit and scope of the invention. For example, while the algorithms noted above are described in terms of visual video, an additional parallel processor can be used to implement an audio channel, which audio is sensed using AN analog to digital converter. Also, the photo sensor array, as illustrated in FIG. 4, can be located adjacent to the pixel memory, rather than above it as illustrated in FIG. 3. Accordingly, the present invention is properly defined by the following claims.

APPENDIX A

The RGB-YUV conversion is a pixel level operation. It consists of a matrix multiplication of the color vector to produce the target color vector. This is depicted in the following equation:

$$\begin{bmatrix} Y \\ U \\ V \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \times \begin{bmatrix} R \\ G \\ B \end{bmatrix}$$

The implications are as follows:
1. The color vectors have to be pre-loaded from pixel DRAM 30
2. The coefficients $a_{ij}$ have to be loaded into the local memory of each processor 40
3. The resulting color vector has to be stored back to the pixel DRAM 30

Note that this algorithm is data independent (i.e. regardless of what values R, G, or B takes on, the program flow is not affected). This means that instructions can be pipelined to each processor in a predictable manner. Also, no local buffering of the instructions is necessary. Each processor executes the instruction on a first-come-first-serve basis. In effect, the array processors can be programmed as a single processing entity. Note that the pseudo-code given below does not pay any attention to how the instructions are fed to each processor.

The processor uses a 4 stage pipeline: fetch, decode/address generation, read, and execute. In data independent mode, the processor takes the pipelined instruction and decodes them directly. As a result, the pipeline looks like a 3 stage pipeline.

A sample pseudo code for implementing this algorithm follows:

| Instruction arrives at the processor | Cycle | Action taken by the processor |
|---|---|---|
| Store coefficient $a_{11}$ into auxiliary RAM | 1 | |
| Store coefficient $a_{12}$ into auxiliary RAM | 2 | |
| Store coefficient $a_{13}$ into auxiliary RAM | 3 | |
| Store coefficient $a_{21}$ into auxiliary RAM | 4 | Coefficient $a_{11}$ gets stored in the auxiliary RAM |
| Store coefficient $a_{22}$ into auxiliary RAM | 5 | Coefficient $a_{12}$ gets stored in the auxiliary RAM |
| Store coefficient $a_{23}$ into auxiliary RAM | 6 | Coefficient $a_{13}$ gets stored in the auxiliary RAM |
| Store coefficient $a_{31}$ into auxiliary RAM | 7 | Coefficient $a_{21}$ gets stored in the auxiliary RAM |
| Store coefficient $a_{32}$ into auxiliary RAM | 8 | Coefficient $a_{22}$ gets stored in the auxiliary RAM |
| Store coefficient $a_{33}$ into auxiliary RAM | 9 | Coefficient $a_{23}$ gets stored in the auxiliary RAM |
| Processor issues request to DMA to load "red" packet | 10 | Coefficient $a_{31}$ gets stored in the auxiliary RAM |
| Processor issues request to DMA to load "green" packet | 11 | Coefficient $a_{32}$ gets stored in the auxiliary RAM |
| Processor issues request to DMA to load "blue" packet | 12 | Coefficient $a_{33}$ gets stored in the auxiliary RAM |
| | 13 | DMA receives request to load "red" packet from processor |
| | 14 | DMA issues read to DRAM to load "red" packet<br>DMA receives request to load "green" packet from processor but since another request is still in progress, DMA buffers this request |
| $reg_1 = a_{11} * red_1$ | 15 | DMA receives request to load "blue" packet from processor but since the other requests are still in progress, DMA buffers this request |
| $reg_2 = a_{21} * red_1$ | 16 | "red" packet arrives at the DMA and gets buffered.<br>The DMA immediately issues a write of the 1$^{st}$ pixel in the "red" packet to the block visible RAM.<br>DMA issues read to DRAM to load "green" packet |
| $reg_3 = a_{31} * red_1$ | 17 | 1$^{st}$ "red" pixel is available in the block visible RAM |
| $reg_4 = a_{12} * green_1$ | 18 | "green" packet arrives at the DMA and gets buffered<br>The DMA immediately issues a write of the 1$^{st}$ pixel in the "green" packet to the block visible RAM.<br>2$^{nd}$ "red" pixel is available in the block visible RAM<br>DMA issues read to DRAM to load "blue" packet<br>$reg_1 = a_{11} * red_1$ |
| $reg_1 = reg_1 + reg_4$ | 19 | 3$^{rd}$ "red" pixel is available in the block visible RAM<br>1$^{st}$ "green" pixel is available in the block visible RAM<br>$reg_2 = a_{21} * red_1$ |
| $reg_4 = a_{22} * green_1$ | 20 | "blue" packet arrives at the DMA and gets buffered<br>The DMA immediately issues a write of the 1$^{st}$ pixel in the "blue" packet to the block visible RAM.<br>4$^{th}$ "red" pixel is available in the block visible RAM<br>2$^{nd}$ "green" pixel is available in the block visible RAM<br>$reg_3 = a_{31} * red_1$ |
| $reg_2 = reg_2 + reg_4$ | 21 | 5$^{th}$ "red" pixel is available in the block visible RAM<br>3$^{rd}$ "green" pixel is available in the block visible RAM<br>1$^{st}$ "blue" pixel is available in the block visible RAM<br>$reg_4 = a_{12} * green_1$ |
| $reg_4 = a_{32} * green_1$ | 22 | 6$^{th}$ "red" pixel is available in the block visible RAM<br>4$^{th}$ "green" pixel is available in the block visible RAM<br>2$^{nd}$ "blue" pixel is available in the block visible RAM<br>$reg_1 = reg_1 + reg_4 = a_{11} * red_1 + a_{12} * green_1$ |
| $reg_3 = reg_3 + reg_4$ | 23 | 7$^{th}$ "red" pixel is available in the block visible RAM<br>5$^{th}$ "green" pixel is available in the block visible RAM<br>3$^{rd}$ "blue" pixel is available in the block visible RAM<br>$reg_4 = a_{22} * green_1$ |

-continued

| Instruction arrives at the processor | Cycle | Action taken by the processor |
| --- | --- | --- |
| $reg_4 = a_{13} * blue_1$ | 24 | $8^{th}$ "red" pixel is available in the block visible RAM<br>$6^{th}$ "green" pixel is available in the block visible RAM<br>$4^{th}$ "blue" pixel is available in the block visible RAM<br>$reg_2 = reg_2 + reg_4 = a_{21} * red_1 + a_{22} * green_1$ |
| $reg_1 = reg_1 + reg_4, Y = reg_1$ | 25 | $7^{th}$ "green" pixel is available in the block visible RAM<br>$5^{th}$ "blue" pixel is available in the block visible RAM<br>$reg_4 = a_{32} * green_1$ |
| $reg_4 = a_{23} * blue_1$ | 26 | $8^{th}$ "green" pixel is available in the block visible RAM<br>$6^{th}$ "blue" pixel is available in the block visible RAM<br>$reg_3 = reg_3 + reg_4 = a_{31} * red_1 + a_{32} * green_1$ |
| $reg_2 = reg_2 + reg_4, U = reg_2$ | 27 | $7^{th}$ "blue" pixel is available in the block visible RAM<br>$reg_4 = a_{13} * blue_1$ |
| $reg_4 = a_{33} * blue_1$ | 28 | $8^{th}$ "blue" pixel is available in the block visible RAM<br>$reg_1 = reg_1 + reg_4 = Y$ |
| $reg_3 = reg_3 + reg_4, V = reg_3$ | 29 | $reg_4 = a_{23} * blue_1$ |
| Store $reg_1$ to $Y_1$ in block visible RAM | 30 | $reg_2 = reg_2 + reg_4 = U$ |
| Store $reg_2$ to $U_1$ in block visible RAM | 31 | $reg_4 = a_{33} * blue_1$ |
| Store $reg_3$ to $V_1$ in block visible RAM | 32 | $reg_3 = reg_3 + reg_4 = V$ |
| $reg_1 = a_{11} * red_2$ | 33 | $Y_1 \leftarrow reg_1$ |
| $reg_2 = a_{21} * red_2$ | 34 | $U_1 \leftarrow reg_2$ |
| $reg_3 = a_{31} * red_2$ | 35 | $V_1 \leftarrow reg_3$ |
| $reg_4 = a_{12} * green_2$ | 36 | $reg_1 = a_{11} * red_2$ |
| $reg_1 = reg_1 + reg_4$ | 37 | $reg_2 = a_{21} * red_2$ |
| $reg_4 = a_{22} * green_2$ | 38 | $reg_3 = a_{31} * red_2$ |
| $reg_2 = reg_2 + reg_4$ | 39 | $reg_4 = a_{12} * green_2$ |
| $reg_4 = a_{32} * green_2$ | 40 | $reg_1 = reg_1 + reg_4$ |
| $reg_3 = reg_3 + reg_4$ | 41 | $reg_4 = a_{22} * green_2$ |
| $reg_4 = a_{13} * blue_2$ | 42 | $reg_2 = reg_2 + reg_4$ |
| $reg_1 = reg_1 + reg_4, Y = reg_1$ | 43 | $reg_4 = a_{32} * green_2$ |
| $reg_4 = a_{23} * blue_2$ | 44 | $reg_3 = reg_3 + reg_4$ |
| $reg_2 = reg_2 + reg_4, U = reg_2$ | 45 | $reg_4 = a_{13} * blue_2$ |
| $reg_4 = a_{33} * blue_2$ | 46 | $reg_1 = reg_1 + reg_4 = Y$ |
| $reg_3 = reg_3 + reg_4, V = reg_3$ | 47 | $reg_4 = a_{23} * blue_1$ |
| Store $reg_1$ to $Y_2$ in block visible RAM | 48 | $reg_2 = reg_2 + reg_4 = U$ |
| Store $reg_2$ to $U_2$ in block visible RAM | 49 | $reg_4 = a_{33} * blue_1$ |
| Store $reg_3$ to $V_2$ in block visible RAM | 50 | $reg_3 = reg_3 + reg_4 = V$ |
| $reg_1 = a_{11} * red_3$ | 51 | $Y_1 \leftarrow reg_1$ |
| $reg_2 = a_{21} * red_3$ | 52 | $U_1 \leftarrow reg_2$ |
| $reg_3 = a_{31} * red_3$ | 53 | $V_1 \leftarrow reg_3$ |
| $reg_4 = a_{12} * green_3$ | 54 | $reg_1 = a_{11} * red_3$ |
| $reg_1 = reg_1 + reg_4$ | 55 | $reg_2 = a_{21} * red_3$ |
| $reg_4 = a_{22} * green_3$ | 56 | $reg_3 = a_{31} * red_3$ |
| $reg_2 = reg_2 + reg_4$ | 57 | $reg_4 = a_{12} * green_3$ |
| $reg_4 = a_{32} * green_3$ | 58 | $reg_1 = reg_1 + reg_4$ |
| $reg_3 = reg_3 + reg_4$ | 59 | $reg_4 = a_{22} * green_3$ |
| $reg_4 = a_{13} * blue_3$ | 60 | $reg_2 = reg_2 + reg_4$ |
| $reg_1 = reg_1 + reg_4, Y = reg_1$ | 61 | $reg_4 = a_{32} * green_3$ |
| $reg_4 = a_{23} * blue_3$ | 62 | $reg_3 = reg_3 + reg_4$ |
| $reg_2 = reg_2 + reg_4, U = reg_2$ | 63 | $reg_4 = a_{13} * blue_3$ |
| $reg_4 = a_{33} * blue_3$ | 64 | $reg_1 = reg_1 + reg_4 = Y$ |
| $reg_3 = reg_3 + reg_4, V = reg_3$ | 65 | $reg_4 = a_{23} * blue_3$ |
| Store $reg_1$ to $Y_3$ in block visible RAM | 66 | $reg_2 = reg_2 + reg_4 = U$ |
| Store $reg_2$ to $U_3$ in block visible RAM | 67 | $reg_4 = a_{33} * blue_3$ |
| Store $reg_3$ to $V_3$ in block visible RAM | 68 | $reg_3 = reg_3 + reg_4 = V$ |
| $reg_1 = a_{11} * red_4$ | 69 | $Y_3 \leftarrow reg_1$ |
| $reg_2 = a_{21} * red_4$ | 70 | $U_3 \leftarrow reg_2$ |
| $reg_3 = a_{31} * red_4$ | 71 | $V_3 \leftarrow reg_3$ |
| $reg_4 = a_{12} * green_4$ | 72 | $reg_1 = a_{11} * red_4$ |
| $reg_1 = reg_1 + reg_4$ | 73 | $reg_2 = a_{21} * red_4$ |
| $reg_4 = a_{22} * green_4$ | 74 | $reg_3 = a_{31} * red_4$ |
| $reg_2 = reg_2 + reg_4$ | 75 | $reg_4 = a_{12} * green_4$ |
| $reg_4 = a_{32} * green_4$ | 76 | $reg_1 = reg_1 + reg_4$ |
| $reg_3 = reg_3 + reg_4$ | 77 | $reg_4 = a_{22} * green_4$ |
| $reg_4 = a_{13} * blue_4$ | 78 | $reg_2 = reg_2 + reg_4$ |
| $reg_1 = reg_1 + reg_4, Y = reg_1$ | 79 | $reg_4 = a_{32} * green_4$ |
| $reg_4 = a_{23} * blue_4$ | 80 | $reg_3 = reg_3 + reg_4$ |
| $reg_2 = reg_2 + reg_4, U = reg_2$ | 81 | $reg_4 = a_{13} * blue_4$ |
| $reg_4 = a_{33} * blue_4$ | 82 | $reg_1 = reg_1 + reg_4 = Y$ |
| $reg_3 = reg_3 + reg_4, V = reg_3$ | 83 | $reg_4 = a_{23} * blue_4$ |
| Store $reg_1$ to $Y_4$ in block visible RAM | 84 | $reg_2 = reg_2 + reg_4 = U$ |
| Store $reg_2$ to $U_4$ in block visible RAM | 85 | $reg_4 = a_{33} * blue_4$ |
| Store $reg_3$ to $V_4$ in block visible RAM | 86 | $reg_3 = reg_3 + reg_4 = V$ |
| $reg_1 = a_{11} * red_5$ | 87 | $Y_4 \leftarrow reg_1$ |
| $reg_2 = a_{21} * red_5$ | 88 | $U_4 \leftarrow reg_2$ |
| $reg_3 = a_{31} * red_5$ | 89 | $V_4 \leftarrow reg_3$ |
| $reg_4 = a_{12} * green_5$ | 90 | $reg_1 = a_{11} * red_5$ |
| $reg_1 = reg_1 + reg_4$ | 91 | $reg_2 = a_{21} * red_5$ |

-continued

| Instruction arrives at the processor | Cycle | Action taken by the processor |
|---|---|---|
| $reg_4 = a_{22} * green_5$ | 92 | $reg_3 = a_{31} * red_5$ |
| $reg_2 = reg_2 + reg_4$ | 93 | $reg_4 = a_{12} * green_5$ |
| $reg_4 = a_{32} * green_5$ | 94 | $reg_1 = reg_1 + reg_4$ |
| $reg_3 = reg_3 + reg_4$ | 95 | $reg_4 = a_{22} * green_5$ |
| $reg_4 = a_{13} * blue_5$ | 96 | $reg_2 = reg_2 + reg_4$ |
| $reg_1 = reg_1 + reg_4, Y = reg_1$ | 97 | $reg_4 = a_{32} * green_5$ |
| $reg_4 = a_{23} * blue_5$ | 98 | $reg_3 = reg_3 + reg_4$ |
| $reg_2 = reg_2 + reg_4, U = reg_2$ | 99 | $reg_4 = a_{13} * blue_5$ |
| $reg_4 = a_{33} * blue_5$ | 100 | $reg_1 = reg_1 + reg_4 = Y$ |
| $reg_3 = reg_3 + reg_4, V = reg_3$ | 101 | $reg_4 = a_{23} * blue_5$ |
| Store $reg_1$ to $Y_5$ in block visible RAM | 102 | $reg_2 = reg_2 + reg_4 = U$ |
| Store $reg_2$ to $U_5$ in block visible RAM | 103 | $reg_4 = a_{33} * blue_5$ |
| Store $reg_3$ to $V_5$ in block visible RAM | 104 | $reg_3 = reg_3 + reg_4 = V$ |
| $reg_1 = a_{11} * red_6$ | 105 | $V_5 \leftarrow reg_1$ |
| $reg_2 = a_{21} * red_6$ | 106 | $U_5 \leftarrow reg_2$ |
| $reg_3 = a_{31} * red_6$ | 107 | $V_5 \leftarrow reg_3$ |
| $reg_4 = a_{12} * green_6$ | 108 | $reg_1 = a_{11} * red_6$ |
| $reg_1 = reg_1 + reg_4$ | 109 | $reg_2 = a_{21} * red_6$ |
| $reg_4 = a_{22} * green_6$ | 110 | $reg_3 = a_{31} * red_6$ |
| $reg_2 = reg_2 + reg_4$ | 111 | $reg_4 = a_{12} * green_6$ |
| $reg_4 = a_{32} * green_6$ | 112 | $reg_1 = reg_1 + reg_4$ |
| $reg_3 = reg_3 + reg_4$ | 113 | $reg_4 = a_{22} * green_6$ |
| $reg_4 = a_{13} * blue_6$ | 114 | $reg_2 = reg_2 + reg_4$ |
| $reg_1 = reg_1 + reg_4, Y = reg_1$ | 115 | $reg_4 = a_{32} * green_6$ |
| $reg_4 = a_{23} * blue_6$ | 116 | $reg_3 = reg_3 + reg_4$ |
| $reg_2 = reg_2 + reg_4, U = reg_2$ | 117 | $reg_4 = a_{13} * blue_6$ |
| $reg_4 = a_{33} * blue_6$ | 118 | $reg_1 = reg_1 + reg_4 = Y$ |
| $reg_3 = reg_3 + reg_4, V = reg_3$ | 119 | $reg_4 = a_{23} * blue_6$ |
| Store $reg_1$ to $Y_6$ in block visible RAM | 120 | $reg_2 = reg_2 + reg_4 = U$ |
| Store $reg_2$ to $U_6$ in block visible RAM | 121 | $reg_4 = a_{33} * blue_6$ |
| Store $reg_3$ to $V_6$ in block visible RAM | 122 | $reg_3 = reg_3 + reg_4 = V$ |
| $reg_1 = a_{11} * red_7$ | 123 | $Y_6 \leftarrow reg_1$ |
| $reg_2 = a_{21} * red_7$ | 124 | $U_6 \leftarrow reg_2$ |
| $reg_3 = a_{21} * red_7$ | 125 | $V_6 \leftarrow reg_3$ |
| $reg_4 = a_{12} * green_7$ | 126 | $reg_1 = a_{11} * red_7$ |
| $reg_1 = reg_1 + reg_4$ | 127 | $reg_2 = a_{21} * red_7$ |
| $reg_4 = a_{22} * green_7$ | 128 | $reg_3 = a_{31} * red_7$ |
| $reg_2 = reg_2 + reg_4$ | 129 | $reg_4 = a_{12} * green_7$ |
| $reg_4 = a_{32} * green_7$ | 130 | $reg_1 = reg_1 + reg_4$ |
| $reg_3 = reg_3 + reg_4$ | 131 | $reg_4 = a_{22} * green_7$ |
| $reg_4 = a_{13} * blue_7$ | 132 | $reg_2 = reg_2 + reg$ |
| $reg_1 = reg_1 + reg_4, Y = reg_1$ | 133 | $reg_4 = a_{32} * green_7$ |
| $reg_4 = a_{22} * blue_7$ | 134 | $reg_3 = reg_3 + reg_4$ |
| $reg_2 = reg_2 + reg_4, U = reg_2$ | 135 | $reg_4 = a_{13} * blue_7$ |
| Processor issues request to DMA to load the next "red" packet | 136 | $reg_1 = reg_1 + reg_4 = Y$ |
| $reg_4 = a_{33} * blue_7$ | 137 | $reg_4 = a_{23} * blue_7$ |
| $reg_3 = reg_3 + reg_4, V = reg_3$ | 138 | $reg_2 = reg_2 + reg_4 = U$ |
| Store $reg_1$ to $Y_7$ in block visible RAM | 139 | DMA issues read to DRAM to load "red" packet |
| Store $reg_2$ to $U_7$ in block visible RAM | 140 | $reg_4 = a_{33} * blue_7$ |
| Processor issues request to DMA to load the next "green" packet | 141 | $reg_3 = reg_3 + reg_4 = V$<br>"red" packet arrives at the DMA and gets buffered. The DMA immediately issues a write of the 1$^{st}$ pixel in the "red" packet to the block visible RAM. |
| Store $reg_3$ to $V_7$ in block visible RAM | 142 | $Y_7 \leftarrow reg_1$<br>1$^{st}$ "red" pixel is available in the block visible RAM |
| $reg_1 = a_{11} * red_8$ | 143 | $U_7 \leftarrow reg_2$<br>2$^{nd}$ "red" pixel is available in the block visible RAM |
| $reg_2 = a_{21} * red_8$ | 144 | 3$^{rd}$ "red" pixel is available in the block visible RAM<br>DMA issues read to DRAM to load "green" packet |
| $reg_3 = a_{31} * red_8$ | 145 | $V_7 \leftarrow reg_3$<br>4$^{th}$ "red" pixel is available in the block visible RAM |
| $reg_4 = a_{12} * green_8$ | 146 | $reg_1 = a_{11} * red_8$<br>5$^{th}$ "red" pixel is available in the block visible RAM<br>"green" packet arrives at the DMA and gets buffered. The DMA immediately issues a write of the 1$^{st}$ pixel in the "green" packet to the block visible RAM. |
| Processor issues request to DMA to load the next "blue" packet | 147 | $reg_2 = a_{21} * red_8$<br>6$^{th}$ "red" pixel is available in the block visible RAM<br>1$^{st}$ "green" pixel is available in the block visible RAM |
| $reg_1 = reg_1 + reg_4$ | 148 | $reg_3 = a_{31} * red_3$<br>7$^{th}$ "red" pixel is available in the block visible RAM<br>2$^{nd}$ "green" pixel is available in the block visible RAM |
| $reg_4 = a_{22} * green_8$ | 149 | $reg_4 = a_{12} * green_8$<br>8$^{th}$ "red" pixel is available in the block visible RAM<br>3$^{rd}$ "green" pixel is available in the block visible RAM |

-continued

| Instruction arrives at the processor | Cycle | Action taken by the processor |
|---|---|---|
| $reg_2 = reg_2 + reg_4$ | 150 | 4th "green" pixel is available in the block visible RAM<br>DMA issues read to DRAM to load "blue" packet |
| $reg_4 = a_{32} * green_8$ | 151 | $reg_1 = reg_1 + reg_4$<br>5th "green" pixel is available in the block visible RAM |
| $reg_3 = reg_3 + reg_4$ | 152 | $reg_4 = a_{22} * green_8$<br>6th "green" pixel is available in the block visible RAM<br>"blue" packet arrives at the DMA and gets buffered.<br>The DMA immediately issues a write of the 1st pixel in the "blue" packet to the block visible RAM. |
| $reg_4 = a_{13} * blue_8$ | 153 | $reg_2 = reg_2 + reg_4$<br>7th "green" pixel is available in the block visible RAM<br>1st "blue" pixel is available in the block visible RAM |
| $reg_1 = reg_1 + reg_4, Y = reg_1$ | 154 | $reg_4 = a_{32} * green_8$<br>8th "green" pixel is available in the block visible RAM<br>2nd "blue" pixel is available in the block visible RAM |
| $reg_4 = a_{23} * blue_8$ | 155 | $reg_3 = reg_3 + reg_4$<br>3rd "blue" pixel is available in the block visible RAM |
| $reg_2 = reg_2 + reg_4, U = reg_2$ | 156 | $reg_4 = a_{13} * blue_3$<br>4th "blue" pixel is available in the block visible RAM |
| $reg_4 = a_{33} * blue_8$ | 157 | $reg_1 = reg_1 + reg_4 = Y$<br>5th "blue" pixel is available in the block visible RAM |
| $reg_3 = reg_3 + reg_4, V = reg_3$ | 158 | $reg_4 = a_{23} * blue_8$<br>6th "blue" pixel is available in the block visible RAM |
| Store $reg_1$ to $Y_8$ in block visible RAM | 159 | $reg_2 = reg_2 + reg_4 = U$<br>7th "blue" pixel is available in the block visible RAM |
| Processor issues Write request to DMA to store Y packet | 160 | $reg_4 = a_{33} * blue_8$<br>8th "blue" pixel is available in the block visible RAM |
| Store $reg_2$ to $U_8$ in block visible RAM | 161 | $reg_3 = reg_3 + reg_4 = V$ |
| Processor issues write request to DMA to store U packet | 162 | $Y_8 \leftarrow reg_1$ |
| Store $reg_3$ to $V_8$ in block visible RAM | 163 | DMA loads the Y packet from block visible RAM and buffers it for writing to DRAM |
|  | 164 | $U_8 \leftarrow reg_2$<br>DMA issues a write to the DRAM to store the Y packet |
|  | 165 | DMA loads the U packet from block visible RAM and buffers it for writing to DRAM |
| $reg_1 = a_{11} * red_1$ | 166 | $V_8 \leftarrow reg_3$<br>DMA issues a write to the DRAM to store the U packet |
| $reg_2 = a_{21} * red_1$ | 167 | DMA loads the V packet from block visible RAM and buffers it for writing to DRAM |
| $reg_3 = a_{31} * red_1$ | 168 | DMA issues a write to the DRAM to store the V packet |
| $reg_4 = a_{12} * green_1$ | 169 | $reg_1 = a_{11} * red_1$ |
| $reg_1 = reg_1 + reg_4$ | 170 | $reg_2 = a_{21} * red_1$ |
| $reg_4 = a_{22} * green_1$ | 171 | $reg_3 = a_{31} * red_1$ |
| $reg_2 = reg_2 + reg_4$ | 172 | $reg_4 = a_{12} * green_1$ |
| $reg_4 = a_{32} * green_1$ | 173 | $reg_1 = reg_1 + reg_4$ |
| $reg_3 = reg_3 + reg_4$ | 174 | $reg_4 = a_{22} * green_1$ |
| $reg_4 = a_{13} * blue_1$ | 175 | $reg_2 = reg_2 + reg_4$ |
| $reg_1 = reg_1 + reg_4, Y = reg_1$ | 176 | $reg_4 = a_{32} * green_1$ |
| $reg_4 = a_{23} * blue_1$ | 177 | $reg_3 = reg_3 + reg_4$ |
| $reg_2 = reg_2 + reg_4, U = reg_2$ | 178 | $reg_4 = a_{13} * blue_1$ |
| $reg_4 = a_{33} * blue_1$ | 179 | $reg_1 = reg_1 + reg_4 = Y$ |
| $reg_3 = reg_3 + reg_4, V = reg_3$ | 180 | $reg_4 = a_{23} * blue_1$ |
| Store $reg_1$ to $Y_1$ in block visible RAM | 181 | $reg_2 = reg_2 + reg_4 = U$ |
| Store $reg_2$ to $U_1$ in block visible RAM | 182 | $reg_4 = a_{33} * blue_1$ |
| Store $reg_3$ to $V_1$ in block visible RAM | 183 | $reg_3 = reg_3 + reg_4 = V$ |
|  | 184 | $Y_1 \leftarrow reg_1$ |
|  | 185 | $U_1 \leftarrow reg_2$ |
|  | 186 | $V_1 \leftarrow reg_3$ |
|  | 187 |  |

Total cycle count for RGB-YUV is 152 cycles/8 pixels per cycle*480 V pixels*16 H pixels=145,920 cycles.

What is claimed is:

1. An apparatus for detecting an image at a predetermined resolution comprising:

an integrated circuit chip including:

an image sensor array, said image sensor array capable of detecting said image at the predetermined resolution and outputting detected signals corresponding to said sensed image at said predetermined resolution;

a plurality of processor elements each coupled to said image sensor array and capable of inputting a predetermined number of said detected signals, such that each of said detected signals are input to one of said plurality of processor elements, said processor elements each concurrently operating upon said input detected signals using video-image algorithmic coding, and generating encoded signals corresponding thereto, said encoded signals being concurrently output from each of said plurality of parallel processor elements;

an output comparator for translating the encoded signals output from the parallel processor elements and generating information representative of the encoded signals;

an array processor memory for controlling operation of the plurality of processor elements; and a main controller, operable in parallel with the array processor, for performing control monitoring of the array processor and the parallel processor elements.

2. The apparatus of claim 1, wherein the main controller is further for post-processing the information generated by the output comparator.

3. The apparatus of claim 1, wherein the array processor controller is for controlling the processor elements by simple branching and pipelining of instructions.

4. The apparatus of claim 1, wherein the array processor controller is for controlling the processor elements using data-independent branches.

5. The apparatus of claim 1, wherein the main controller is for controlling starting and stopping of the array processor controller.

6. The apparatus of claim 1, wherein the main controller and the array processor controller synchronize with one another through the exchange of processing synchronization information.

7. The apparatus of claim 1, wherein the output comparator is for generating the information based on a reordering of the signals output by the processor elements.

8. The apparatus of claim 1, wherein the information generated by the output comparator includes information reflective of the status of a processor element.

9. The apparatus of claim 1, where the output comparator is for buffering information exchanged between the processor elements and the main controller.

10. The apparatus of claim 1, wherein the output comparator is for selecting a set of processor elements to execute a pipelined instruction stream and causing processor elements not in the set to ignore the stream.

11. The apparatus of claim 1, wherein the information generated by the output comparator includes status information reflective of the collective status of all processor elements.

12. The apparatus of claim 1, wherein the output comparator is for providing information directly from the main controller to a selected group of processor elements.

13. The apparatus of claim 1, wherein the output comparator is for providing information representative of the status of program completion of a processor element to the array processor controller.

14. The apparatus of claim 1, wherein the output comparator is for providing information representative of the execution by a processor element of a processing milestone.

15. An apparatus for detecting an image at a predetermined resolution comprising:

an integrated circuit chip including
an image sensor array, the image sensor array capable of detecting the image at the predetermined resolution and outputting detected signals corresponding to the sensed image at the predetermined resolution;
a plurality of instruction-programmable processor elements each coupled to the image sensor array and capable of inputting a predetermined number of the detected signals, such that each of the detected signals are input to one of the plurality of instruction-programmable processor elements, the instruction-programmable processor elements each concurrently operating upon the input detected signals using video-image algorithmic coding, and generating encoded signals corresponding thereto, the encoded signals being concurrently output from each of the plurality of parallel instruction-programmable processor elements;
an output comparator for translating the encoded signals output from the parallel instruction-programmable processor elements and generating information representative of the encoded signals;
an array processor memory for controlling operation of the plurality of instruction-programmable processor elements; and
a main controller, operable in parallel with the array processor, for performing control monitoring of the array processor and the parallel instruction-programmable processor elements.

* * * * *

UNITED STATES PATENT AND TRADEMARK OFFICE
CERTIFICATE OF CORRECTION

PATENT NO. : 6,757,019 B1 Page 1 of 1
DATED : June 29, 2004
INVENTOR(S) : Hsieh et al.

It is certified that error appears in the above-identified patent and that said Letters Patent is hereby corrected as shown below:

Column 1,
Line 5, insert the following paragraph before the first paragraph:

-- FEDERALLY SPONSORED RESEARCH OR DEVELOPMENT

This invention was made with Government support under contract DARPA N65236-96-C-8608 awarded by the SPA WAR SYS CEN. The Government has certain rights in this invention. --

Column 5,
Line 60, "(preferably less than 0.2 m)" should read -- (preferably less than 0.2m) --.

Column 17,
Line 34, "40/." should read -- 40'. --.

Column 20,
Line 43, "40" should read -- 40' --.

Signed and Sealed this

Second Day of November, 2004

JON W. DUDAS
*Director of the United States Patent and Trademark Office*